(12) United States Patent
Udagave

(10) Patent No.: US 11,682,823 B2
(45) Date of Patent: Jun. 20, 2023

(54) ANTENNA MOUNT KITS AND ANTENNA MOUNT KIT ASSEMBLIES WITH EQUAL STEP TILT ADJUSTMENT AND METHODS OF USING THE SAME

(71) Applicant: CommScope Technologies LLC, Hickory, NC (US)

(72) Inventor: Shital Sawanta Udagave, Maharashtra (IN)

(73) Assignee: CommScope Technologies LLC, Hickory, NC (US)

( * ) Notice: Subject to any disclaimer, the term of this patent is extended or adjusted under 35 U.S.C. 154(b) by 341 days.

(21) Appl. No.: 16/996,034

(22) Filed: Aug. 18, 2020

(65) Prior Publication Data
US 2021/0075083 A1 Mar. 11, 2021

Related U.S. Application Data

(60) Provisional application No. 62/898,184, filed on Sep. 10, 2019.

(51) Int. Cl.
*F16B 2/12* (2006.01)
*H01Q 1/12* (2006.01)
*F16M 13/02* (2006.01)
*F16B 2/00* (2006.01)

(52) U.S. Cl.
CPC ............ *H01Q 1/125* (2013.01); *F16B 2/005* (2013.01); *F16B 2/12* (2013.01); *F16M 13/022* (2013.01); *H01Q 1/1207* (2013.01); *F16M 2200/024* (2013.01); *F16M 2200/06* (2013.01); *H01Q 1/12* (2013.01); *H01Q 1/1228* (2013.01)

(58) Field of Classification Search
CPC .... H01Q 1/125; H01Q 1/1207; H01Q 1/1264; H01Q 1/1228; H01Q 1/12; H01Q 3/02; F16B 2/005; F16B 2/12; F16M 13/022; F16M 2200/024; F16M 2200/06; F16M 11/10; F16M 13/02
See application file for complete search history.

(56) References Cited

U.S. PATENT DOCUMENTS

| | | | | |
|---|---|---|---|---|
| 5,945,961 A | * | 8/1999 | Price | H01Q 3/08 343/882 |
| 7,408,526 B1 | * | 8/2008 | Pan | H01Q 1/125 343/882 |
| 8,339,329 B2 | * | 12/2012 | Shen | H01Q 1/125 343/882 |
| 9,416,913 B2 | * | 8/2016 | Ferguson | F16M 11/105 |

(Continued)

FOREIGN PATENT DOCUMENTS

KR 20160084707 A * 7/2016

*Primary Examiner* — Ab Salam Alkassim, Jr.
*Assistant Examiner* — Anh N Ho
(74) *Attorney, Agent, or Firm* — Myers Bigel, P.A.

(57) ABSTRACT

The present disclosure describes an antenna mount kit. The antenna mount kit includes pivotally coupled mounting brackets, at least one adjustment bracket, and at least one locking plate. One of the mounting brackets and the at least one adjustment bracket each include a plurality of phase adjustment holes configured to lock an antenna at a desired tilt angle that is adjustable at 1 degree steps for different length antennas. Antenna mount kit assemblies and methods of adjusting the downtilt of an antenna are also provided.

20 Claims, 12 Drawing Sheets

(56) References Cited

U.S. PATENT DOCUMENTS

| | | | |
|---|---|---|---|
| 2011/0031360 A1* | 2/2011 | Pan | H01Q 1/1207 248/201 |
| 2011/0168855 A1* | 7/2011 | Bonczyk | H01Q 3/04 248/201 |
| 2021/0408661 A1* | 12/2021 | Yoo | H01Q 1/125 |

* cited by examiner

ANTENNA MOUNT KITS AND ANTENNA MOUNT KIT ASSEMBLIES WITH EQUAL STEP TILT ADJUSTMENT AND METHODS OF USING THE SAME

RELATED APPLICATION(S)

The present application claims priority from and the benefit of U.S. Provisional Application Ser. No. 62/898,184, filed Sep. 10, 2019, the disclosure of which is hereby incorporated herein in its entirety.

FIELD

The present application is directed generally toward telecommunications equipment, and more particularly, antenna mount kits, antenna mount kit assemblies and methods of adjusting the downtilt of an antenna.

BACKGROUND

Currently, existing base station antenna mount kits do not allow for mechanical tilt adjustments of equal degree steps (e.g., 1 degree, 2 degree, etc.). In addition, common platform antennas have different mounting positions depending on the length of the antenna model (see, e.g., FIG. 1B and Table 1). However, an antenna mount kit with fixed hole positions would only allow tilt adjustments of equal degree steps for one antenna length. There may be a need for an antenna mount kit that may be used to adjust the downtilt at one degree steps for different length antennas.

SUMMARY

A first aspect of the present invention is directed to an antenna mount kit. The antenna mount kit includes a first mounting bracket configured to be mounted to a pipe clamp. The first mounting bracket includes a first plurality of phase adjustment holes residing circumferentially around a first pivot hole. Each phase adjustment hole is configured to receive an adjustment bolt and the first pivot hole is configured to receive a pivot bolt. The antenna mount kit further includes a second mounting bracket configured to be mounted to an antenna and pivotally coupled to the first mounting bracket at the first pivot hole. The second mounting bracket includes a first set of antenna adjustment holes configured to receive an adjustment pin, an arcuate slot configured to receive the adjustment bolt, and a second pivot hole configured to receive the pivot bolt. The arcuate slot aligns with the one or more of the phase adjustment holes of the first mounting bracket and the second pivot hole aligns with the first pivot hole of the first mounting bracket. The antenna mount kit further includes at least one adjustable bracket having a second plurality of phase adjustment holes residing circumferentially around a third pivot hole and a second set of antenna adjustment holes that corresponds to the first set of antenna adjustment holes of the second mounting bracket. The number of phase adjustment holes in the adjustable bracket does not equal the number of phase adjustment holes in the first mounting bracket. Each of the phase adjustment holes of the at least one adjustable bracket are configured to receive the adjustment bolt. The third pivot hole aligns with the first and second pivot holes and is configured to receive the pivot bolt, and each of antenna adjustment holes is configured to align with a respective antenna adjustment hole of the second mounting bracket and configured to receive the adjustment pin. The antenna mount kit further includes at least one locking plate having a fourth pivot hole and at least one phase adjustment hole. The fourth pivot hole aligns with the first, second, and third pivot holes and is configured to receive the pivot bolt at a center pivot point. The at least one phase adjustment hole is configured to receive the adjustment bolt, and the locking plate is configured to rotate 360 degrees around the center pivot point such that the at least one phase adjustment hole of the locking plate aligns with one of the phase adjustment holes of the adjustable bracket, the slot of the second mounting bracket, and one of the phase adjustment holes of the first mounting bracket such that when the adjustment bolt is received through the aligned phase adjustment holes and the slot, the antenna is locked at a desired tilt angle.

Another aspect of the present invention is directed to an antenna mount kit assembly. An antenna mount kit assembly includes an antenna, a mounting structure, a pipe clamp configured to be secured to the mounting structure, and an antenna mount kit. The antenna mount kit includes a first mounting bracket mounted to the pipe clamp. The first mounting bracket includes a first plurality of phase adjustment holes residing circumferentially around a first pivot hole. Each phase adjustment hole is configured to receive an adjustment bolt and the first pivot hole is configured to receive a pivot bolt. The antenna mount kit further includes a second mounting bracket mounted to the antenna and pivotally coupled to the first mounting bracket at the first pivot hole. The second mounting bracket includes a first set of antenna adjustment holes configured to receive an adjustment pin, an arcuate slot configured to receive the adjustment bolt, and a second pivot hole configured to receive the pivot bolt. The arcuate slot aligns with the one or more of the phase adjustment holes of the first mounting bracket and the second pivot hole aligns with the first pivot hole of the first mounting bracket. The antenna mount kit further includes at least one adjustable bracket having a second plurality of phase adjustment holes residing circumferentially around a third pivot hole and a second set of antenna adjustment holes that corresponds to the first set of antenna adjustment holes of the second mounting bracket. Each of the phase adjustment holes are configured to receive the adjustment bolt. The third pivot hole aligns with the first and second pivot holes and is configured to receive the pivot bolt. Each of antenna adjustment holes is configured to receive the adjustment pin and configured to align with a respective antenna adjustment hole of the second mounting bracket. The antenna mount kit further includes at least one locking plate having a fourth pivot hole and at least one phase adjustment hole. The fourth pivot hole aligns with the first, second, and third pivot holes and is configured to receive the pivot bolt at a center pivot point. The at least one phase adjustment hole is configured to receive the adjustment bolt, and the locking plate is configured to rotate 360 degrees around the center pivot point such that the at least one phase adjustment hole of the locking plate aligns with one of the phase adjustment holes of the adjustable bracket, the slot of the second mounting bracket, and one of the phase adjustment holes of the first mounting bracket such that when the adjustment bolt is received through the aligned phase adjustment holes and the slot, the antenna is locked at a desired tilt angle. The adjustment pin is inserted through the antenna adjustment holes of the second mounting bracket and the adjustable bracket corresponding to a length of the antenna, and the adjustment bolt is inserted through one phase adjustment hole of the first mounting bracket, the slot of the second mounting bracket, one phase adjustment hole of the adjustable bracket, and the phase adjustment hole of the locking plate to lock the antenna at the corresponding desired tilt angle.

Another aspect of the present invention is directed to methods of adjusting the downtilt of an antenna. The methods include providing an antenna mount kit having a first mounting bracket mounted to a pipe clamp. The first mounting bracket includes a first plurality of phase adjustment holes residing circumferentially around a first pivot hole. Each phase adjustment hole is configured to receive an adjustment bolt and the first pivot hole is configured to receive a pivot bolt. The antenna mount kit further includes a second mounting bracket mounted to an antenna and pivotally coupled to the first mounting bracket at the first pivot hole. The second mounting bracket includes a first set of antenna adjustment holes configured to receive an adjustment pin, an arcuate slot configured to receive the adjustment bolt, and a second pivot hole configured to receive the pivot bolt. The arcuate slot aligns with the one or more of the phase adjustment holes of the first mounting bracket and the second pivot hole aligns with the first pivot hole of the first mounting bracket. The antenna mount kit further includes at least one adjustable bracket having a second plurality of phase adjustment holes residing circumferentially around a third pivot hole and a second set of antenna adjustment holes that correspond to the first set of antenna adjustment holes of the second mounting bracket. Each of the phase adjustment holes are configured to receive the adjustment bolt. The third pivot hole aligns with the first and second pivot holes and is configured to receive the pivot bolt. Each of antenna adjustment holes is configured to receive the adjustment pin and configured to align with a respective antenna adjustment hole of the second mounting bracket. The antenna mount kit further includes at least one locking plate having a fourth pivot hole and at least one phase adjustment hole. The fourth pivot hole aligns with the first, second, and third pivot holes and is configured to receive the pivot bolt at a center pivot point. The at least one phase adjustment hole is configured to receive the adjustment bolt, and the locking plate is configured to rotate 360 degrees around the center pivot point such that the at least one phase adjustment hole of the locking plate aligns with one of the phase adjustment holes of the adjustable bracket, the slot of the second mounting bracket, and one of the phase adjustment holes of the first mounting bracket such that when the adjustment bolt is received through the aligned phase adjustment holes and the slot, the antenna is locked at a desired tilt angle. Methods further include rotating the adjustable bracket and locking plate around the center pivot point such that one of the phase adjustment holes of the adjustable bracket and the phase adjustment hole of the locking plate align with the slot of the second mounting bracket and one of the phase adjustment holes of the first mounting bracket for the desired tilt angle, and inserting the adjustment bolt through the aligned phase adjustment holes and slot, thereby locking the antenna at the desired tilt angle.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1A:
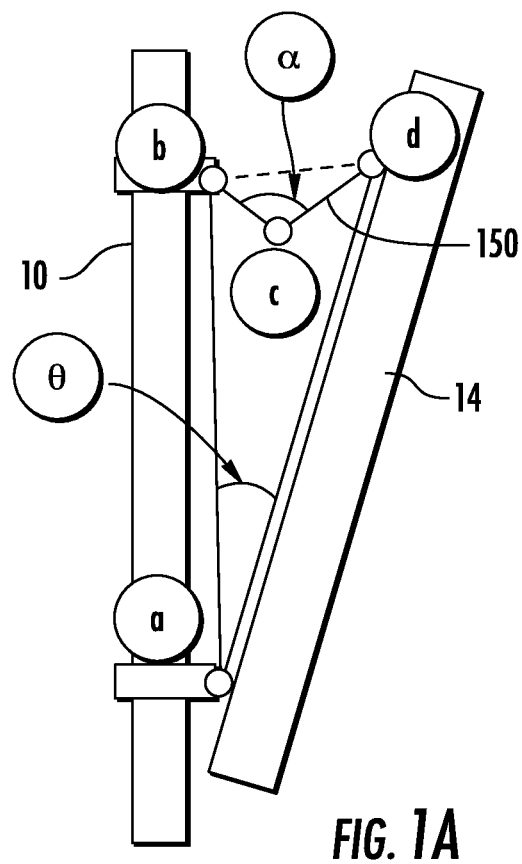
FIG. 1A illustrates the relationship between the downtilt angle of an antenna and the scissor bracket angle of an antenna mount kit according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown. Like numbers refer to like elements throughout and different embodiments of like elements can be designated using a different number of superscript indicator apostrophes (e.g., 10', 10'', 10''').

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As discussed above, existing base station antenna mount kits currently do not allow for mechanical tilt adjustments of equal degree steps (e.g., 1 degree, 2 degree, etc.). Pursuant to embodiments of the present invention, antenna mount kits are provided that may be used to adjust the downtilt of different length antennas at one degree steps. Antenna mount kit assemblies and methods of adjusting the downtilt of an antenna are also provided. Embodiments of the present invention will now be discussed in greater detail with reference to FIGS. 1A-12.

FIG. 1A illustrates the relationship between the tilt angle (e) of an antenna 14 and the angle (a) of a scissor bracket 150 (e.g., an antenna mount kit 100 according to embodiments of the present invention). The existing mechanism for adjusting the tilt angle (e) of an antenna 14 can be represented in the line diagram shown in FIG. 1A (and FIG. 1B), where:

ab=the distance between a top mount point (b) and a bottom mounting point (a) on a mounting structure 10 ad=the distance between mounting points (a, d) on an antenna 14 bc=length of one of the brackets of the scissor bracket 150 (i.e., the distance between top mount point (b) and a center point (c) of the scissor bracket 150)

dc=length of the other bracket of the scissor bracket 150 (i.e., the distance between the center point (c) of the scissor bracket 150 and mounting point (d))

bd=distance from top mount point (b) on the mounting structure 10 and the top mounting point (d) on the antenna 14 for the scissor bracket 150

θ=tilt angle of the antenna 14

α=angle between the scissor bracket 150

Figure 1B:
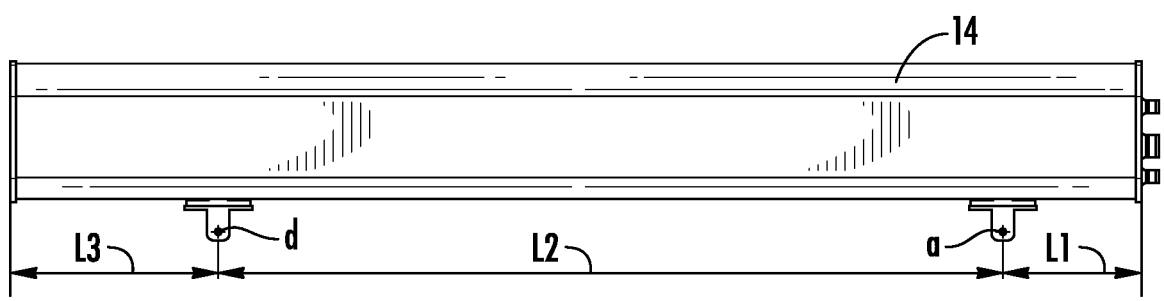
FIG. 1B is a side view of an antenna that may be used with an antenna mount kit according to embodiments of the present invention.

Applying the cosine rule to Δabd and Δbcd: bc=ad−dc+bd. Therefore, the angle (a) between the scissor bracket 150 is a function of bc, dc, ad, and θ. If bc, dc, and θ are fixed values, then the angle (α) between the scissor bracket 150 will vary depending on the distance between the mounting points on an antenna 14 (i.e., distance ad). Thus, having fixed adjustment hole positions in the scissor bracket 150 will only work for one 'ad' value. As shown in FIG. 1B, distances 'L1', 'L2', and 'L3' represent mounting point positions for common platform antenna modules (see also, e.g., Table 1). However, as seen in Table 1, the distance between mounting points (i.e., distance 'ad') for common platform ("CP") antenna models (e.g., A, B, C, and D) is not the same (see also, e.g., FIG. 1B, distance 'L2' is equivalent to distance 'ad'). In addition, if bc, dc, and θ remained fixed, in order to obtain the same tilt angle (a) for the different length antennas 14 (i.e., 1 degree, 2 degree, etc.), the angle (a) between the scissor bracket 150 is not proportional to the length of the antenna 14, but rather decreases as the distance between mounting points (ad) decreases (see, e.g., Table 2). Thus, as shown in Table 2, except for a zero degree tilt angle, the angle (a) between the scissor bracket 150 will be different for different distances (ad) between mounting points to achieve the same degree of tilt. For example, to achieve a 1 degree tilt angle, the angle (α) between the scissor bracket 150 will be different for an "A" length antenna model (5.08°), a "B" length antenna model (6.48°), a "C" length antenna model (8.61°), and a "D" length antenna model)(9.41° (Table 2).

Figure 2:
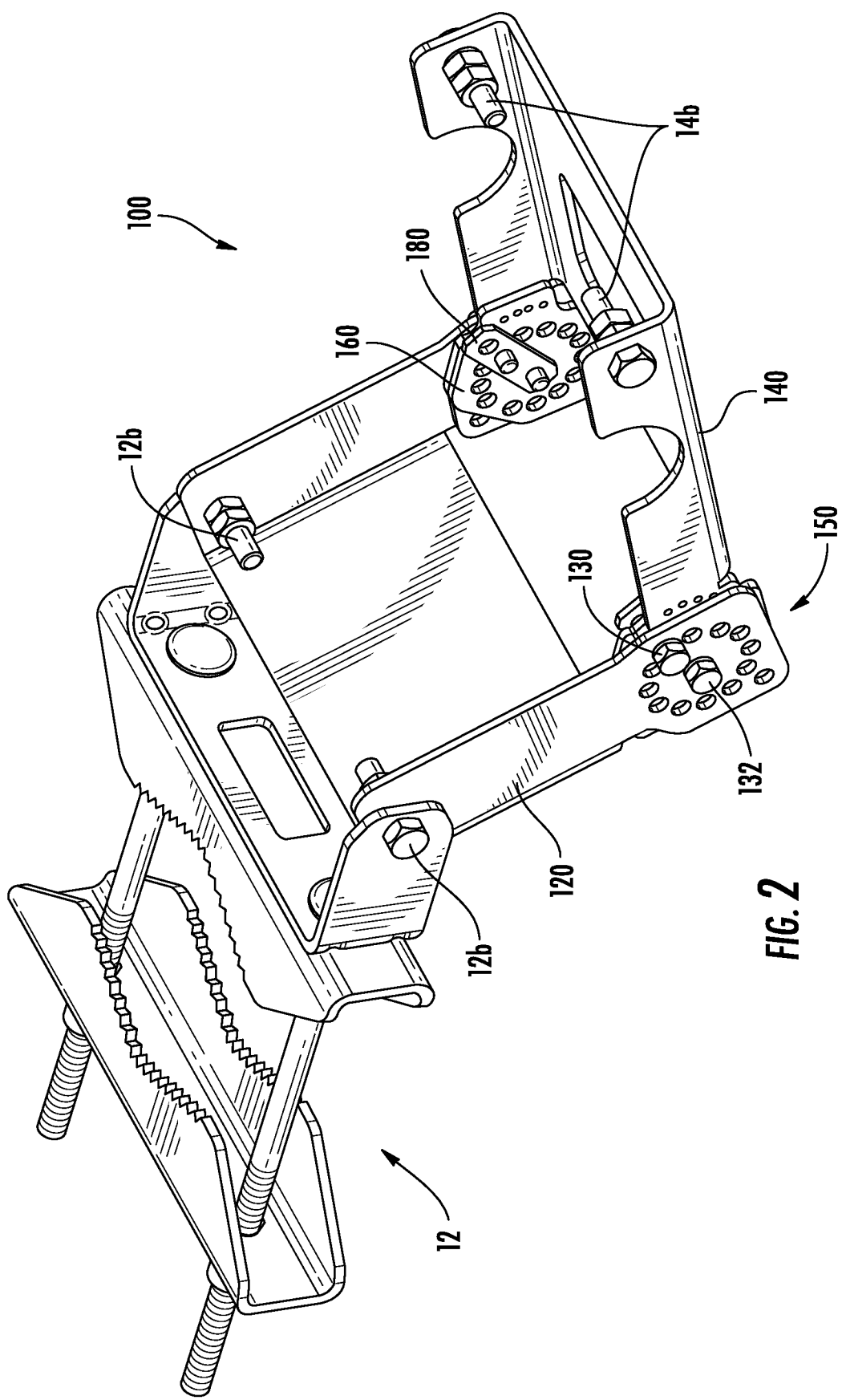
FIG. 2 is a perspective view of an antenna mount kit according to embodiments of the present invention.

Referring to FIG. 2, an antenna mount kit 100 according to embodiments of the present invention is illustrated. The antenna mount kit 100 of the present invention includes a first mounting bracket 120, a second mounting bracket 140, at least one adjustable bracket 160, and at least one locking plate 180. The second mounting bracket 140 is pivotally coupled to the first mounting bracket 120 to form a scissor bracket 150.

Figure 3A:
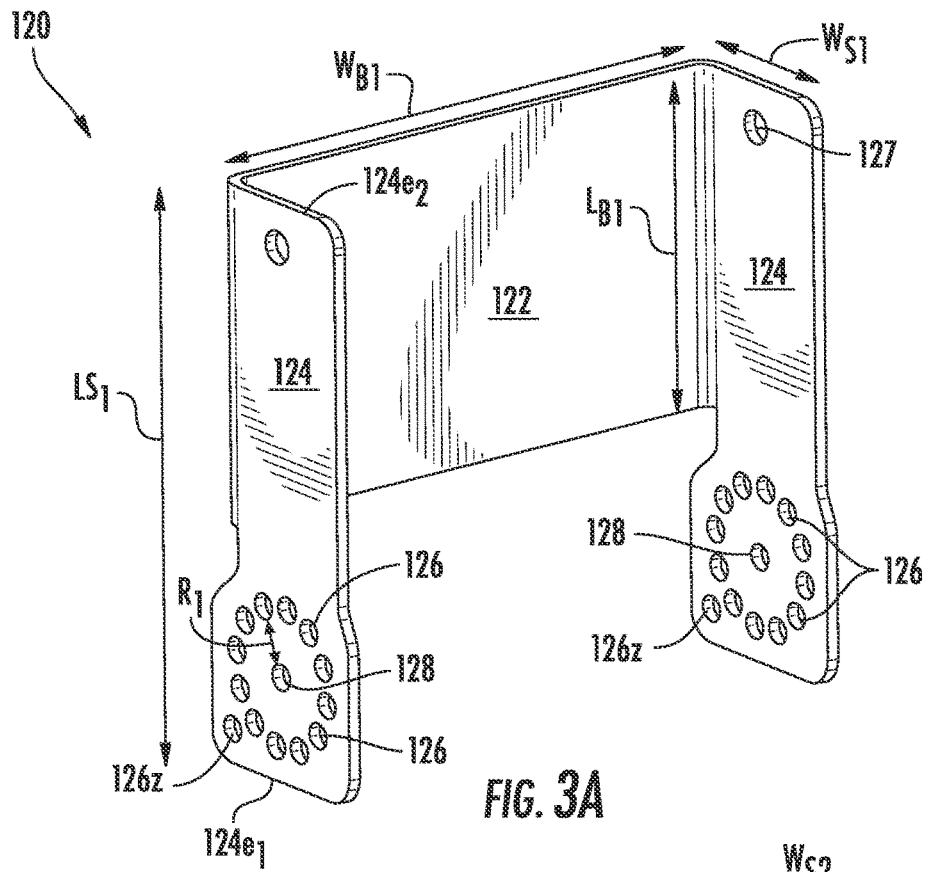
FIG. 3A is a perspective view of a first mounting bracket of the antenna mount kit of FIG. 2.

Each of these components will now be discussed in further detail with reference to FIGS. 3A-3D. The first mounting bracket 120 of the antenna mount kit 100 according to embodiments of the present invention is illustrated in FIG. 3A. In some embodiments, the first mounting bracket 120 is configured to be mounted to a pipe clamp 12 (see also, e.g., FIG. 2, FIG. 5, and FIGS. 6A-6C). For example, the first mounting bracket 120 may comprise one or more mounting apertures 127 each configured to receive a mounting bolt 12b such that the first mounting bracket 120 may be secured to the pipe clamp 12 (see, e.g., FIG. 2 and FIGS. 6A-6C). In some embodiments, the first mounting bracket 120 may be configured to be secured to other known mounting devices.

As shown in FIG. 3A, the first mounting bracket 120 has a base 122 and at least two opposing sidewalls 124 that are coupled to the base 122. The base 122 has a length $L_{B1}$ and a width $W_{B1}$. In some embodiments, the base 122 has a length $L_{B1}$ in the range of about 100 mm to about 150 mm. In some embodiments, the base 122 has a width $W_{B1}$ in the range of about 100 mm to about 200 mm.

The sidewalls 124 each have a width $W_{S1}$ that extends outwardly from the base 122 and each have a length $L_{S1}$. In some embodiments, each sidewall 124 has a length $L_{S1}$ in the range of about 150 mm to about 250 mm and a width $W_{S1}$ in the range of about 50 mm to about 80 mm. In some embodiments, the length $L_{S1}$ of each sidewall 124 is greater than the length $L_{B1}$ of the base 122. For example, in some embodiments, each sidewall 124 of the first mounting bracket 120 has a length $L_{S1}$ of 193 mm and the base 122 of the first mounting bracket 120 has a length $L_{B1}$ of 114 mm.

At least one of sidewalls 124 of the first mounting bracket 120 comprises a first plurality of phase adjustment holes 126. In some embodiments, at least one of the sidewalls 124 of the first mounting bracket 120 may comprise twelve (12) phase adjustment holes 126. The first plurality of phase adjustment holes 126 are located proximate to a first end $124e_1$ of the sidewall 124 and reside circumferentially around a first pivot hole 128. For example, as shown in FIG. 3A, in some embodiments, the phase adjustment holes 126 are positioned around the first pivot hole 128 in a circle having a radius $R_1$. In some embodiments, each of the phase adjustment holes 126 are equally spaced apart around the first pivot hole 128. For example, in some embodiments, the first mounting bracket 120 may comprise twelve (12) phase adjustment holes 126 that are equally spaced apart from each other at 30 degree increments around the first pivot hole 128. In some embodiments, both sidewalls 124 of the first mounting bracket 120 may comprise a plurality of phase adjustment holes 126 and a pivot hole 128, with each sidewall 124 having the same configuration. The one or more mounting apertures 127 of the first mounting bracket 120 may be located proximate to a second opposing end $124e_2$ of the sidewall 124.

Each phase adjustment hole 126 of the first mounting bracket 120 may be configured to receive an adjustment bolt 130 (see, e.g., FIG. 2, FIG. 4, FIG. 6A, and FIG. 6C). In some embodiments, the first pivot hole 128 may be configured to receive a pivot bolt 132 (see, e.g., FIG. 2, FIG. 4, and FIGS. 6A-6C). Each phase adjustment hole 126 and/or the first pivot hole 128 of the first mounting bracket 120 may be configured to receive other known locking mechanisms, such as, threaded rods, screws, pins, or the like.

In some embodiments, the first mounting bracket 120 may further comprise a zero degree phase adjustment hole 126z. As shown in FIG. 3A, the zero degree phase adjustment hole 126z may reside adjacent to the first plurality of phase adjustment holes 126, but be located outside of the plurality of phase adjustment holes 126 surrounding the first pivot hole 128. Similar to the phase adjustment holes 126, the zero-degree phase adjustment hole 126z is configured to receive the adjustment bolt 130. In some embodiments, both sidewalls 124 of the first mounting bracket 120 may comprise a zero-degree phase adjustment hole 126z. As discussed in further detail below, the zero degree phase adjustment hole(s) 126z allow the antenna mount kit 100 to be locked at a zero degree tilt angle (see, e.g., FIGS. 6A-6C).

Figure 3B:
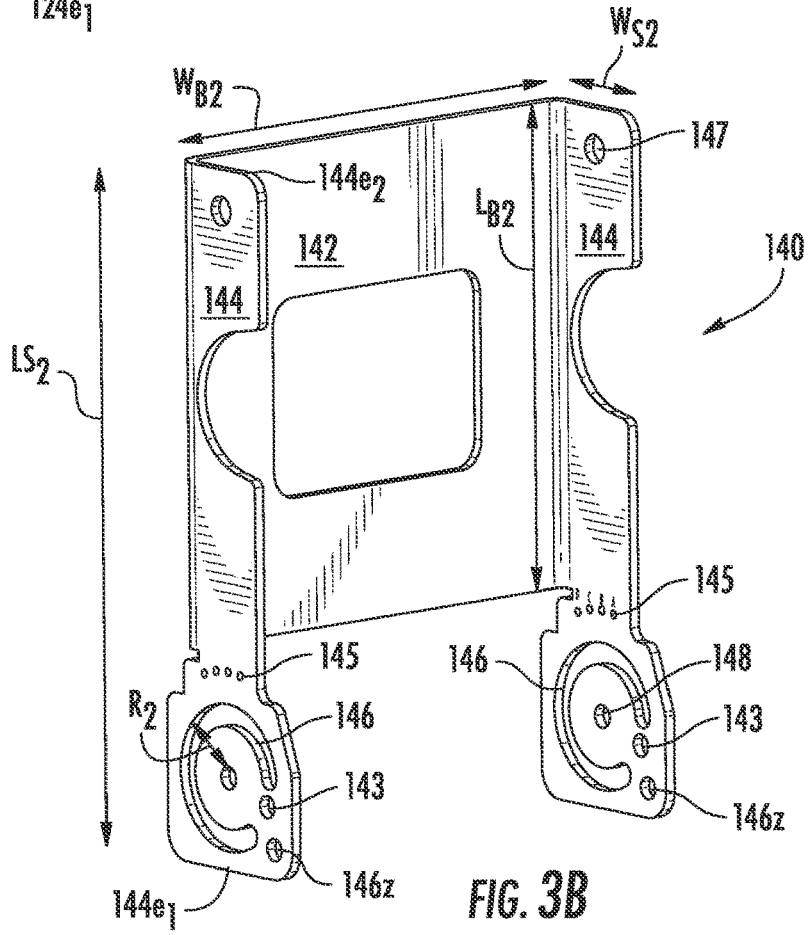
FIG. 3B is a perspective view of a second mounting bracket of the antenna mount kit of FIG. 2.

The first mounting bracket 120 is pivotally coupled to the second mounting bracket 140 at the first pivot hole 128. The second mounting bracket 140 of the antenna mount kit 100 according to embodiments of the present invention is illustrated in FIG. 3B. The second mounting bracket 140 is configured to be mounted to an antenna 14 (see, e.g., FIG. 5). For example, the second mounting bracket 140 may comprise one or more mounting apertures 147 that are each configured to receive a mounting bolt 14b such that the antenna 14 may be secured to the second mounting bracket 140 (see, e.g., FIG. 5).

As shown in FIG. 3B, the second mounting bracket 140 has a base 142 and at least two opposing sidewalls 144 that are coupled to the base 142. The base 142 has a length $L_{B2}$ and a width $W_{B2}$. In some embodiments, the base 142 has a length $L_{B2}$ in the range of about 100 mm to about 300 mm. In some embodiments, the base 142 has a width $W_{B2}$ in the range of about 100 mm to about 200 mm.

The sidewalls 144 each have a width $W_{S2}$ that extends outwardly from the base 142 each have a length $L_{S2}$. In some embodiments, each sidewall 144 has a length $L_{S2}$ in the range of about 200 mm to about 350 mm and a width $W_{S2}$ in the range of about 50 mm to about 80 mm. In some embodiments, the sidewalls 144 have a length $L_{S2}$ that is greater than the length $L_{B2}$ of the base 142. For example, in some embodiments, each sidewall 144 of the second mounting bracket 140 has a length $L_{S2}$ of 264 mm and the base 142 of the second mounting bracket 140 has a length $L_{B2}$ of 183 mm.

At least one sidewall 144 of the second mounting bracket 140 comprises an arcuate slot 146 and a second pivot hole 148 that are located proximate to a first end $144e_1$ of the sidewall 144. The arcuate slot 146 has a radius $R_2$. The second pivot hole 148 is located at a center point of the arcuate slot 146 that is equal to the radius $R_2$ of the slot 146 (see also, e.g., FIG. 7). The second pivot hole 148 is configured to receive the pivot bolt 132 and aligns with the first pivot hole 128 of the first mounting bracket 120 such that the second mounting bracket 140 may be pivotally coupled to the first mounting bracket 120 (see, e.g., FIG. 2, FIG. 4, and FIGS. 6A-6C). When the first and second mounting brackets 120, 140 are pivotally coupled together, the arcuate slot 146 of the second mounting bracket 140 aligns with one or more of the phase adjustment holes 126 of the first mounting bracket 120. In some embodiments, the arcuate slot 146 is configured to receive the adjustment bolt 130. The one or more mounting apertures 147 of the second mounting bracket 140 may be located proximate to a second opposing end $144e_2$ of the sidewall 144.

Still referring to FIG. 3B, at least one sidewall 144 of the second mounting bracket 140 further comprises a first set of antenna adjustment holes 145. In some embodiments, the second mounting bracket 140 comprises four (4) antenna adjustment holes 145. As will be discussed in further detail below, each antenna adjustment hole 145 corresponds to a different common platform antenna model length (e.g., A/B/C/D antenna models). Each antenna adjustment hole 145 is configured to receive an adjustment pin 134 (or other known locking mechanism) (see, e.g., FIG. 4).

In some embodiments, the second mounting bracket 140 may further comprise a zero degree phase adjustment hole 146z that is configured to receive the adjustment bolt 130. The zero degree phase adjustment hole 146z of the second mounting bracket 140 is configured to align with the zero degree phase adjustment hole 126z of the first mounting bracket 120 such that the antenna mount kit 100 may be locked at a zero degree tilt angle (see, e.g., FIGS. 6A-6C). In some embodiments, the second mounting bracket 140 may further comprise a reference hole 143. The reference hole 143 may be used to create the pattern of holes (i.e., the phase adjustment holes 166 and the antenna adjustment holes 165) on the adjustable bracket 160. For example, if the hole pattern for the phase adjustment holes 166 and antenna adjustment holes 165 on the adjustable bracket 160 is designed considering reference hole 143 for A length antenna models, then the reference hole 143 will match with one of the phase adjustment holes 166 on adjustable bracket 160, but will not match for the other antenna models, i.e., B/C/D antenna models.

Similar to the sidewalls 124 of the first mounting bracket 120, in some embodiments, both sidewalls 144 of the second mounting bracket 140 may have a mirrored configuration, i.e., both sidewalls 144 of the second mounting bracket 140 may comprise a plurality of antenna adjustment holes 145, an arcuate slot 146, a second pivot hole 148, a zero degree phase adjustment hole 146z, and a reference hole 143 having the same configuration.

In some embodiments, the first mounting bracket 120 and the second mounting bracket 140 may each comprise a unitary member. For example, the first mounting bracket 120 may be formed from a single piece of steel which is bent to form the base 122 and opposing sidewalls 124. Similarly, the second mounting bracket 140 may be formed from a single piece of steel which is bent to form the base 142 and opposing sidewalls 144.

The antenna mount kit 100 of the present invention further comprises at least one adjustment bracket 160. In some embodiments, the antenna mount kit 100 may comprise two adjustment brackets 160. An adjustable bracket 160 according to embodiments of the present invention is illustrated in FIG. 3C.

Figure 3C:
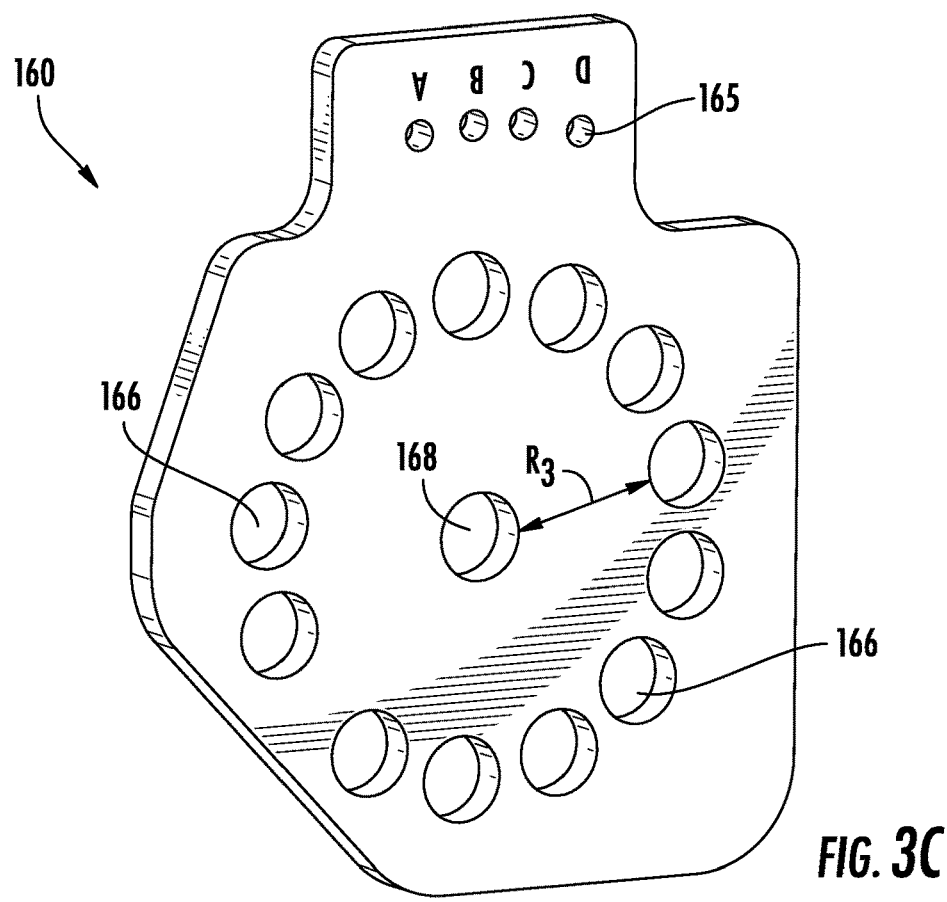
FIG. 3C is a perspective view of an adjustable bracket of the antenna mount kit of FIG. 2.
Figure 4:
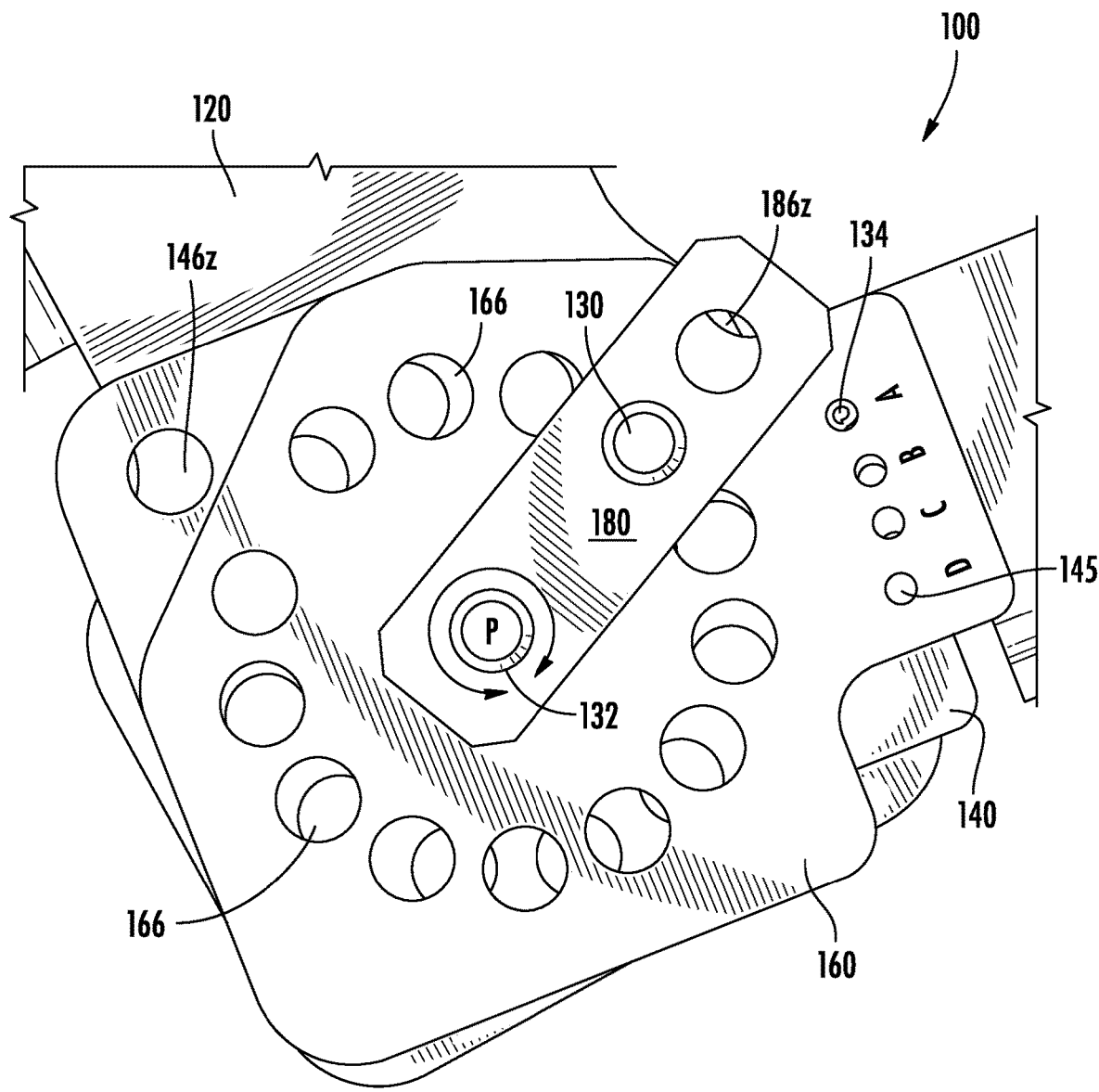
FIG. 4 is an enlarged view of the locking plate, the adjustable bracket, the second mounting bracket, and the first mounting bracket of the antenna mount kit pivotally coupled together at a center pivot point according to embodiments of the present invention.

As shown in FIG. 3C, in some embodiments, the adjustable bracket 160 comprises a second plurality of phase adjustment holes 166. For example, in some embodiments, the adjustable bracket 160 may comprise thirteen (13) phase adjustment holes 166. In some embodiments, the phase adjustment holes 166 may reside circumferentially around a third pivot hole 168, i.e., the phase adjustment holes 166 are positioned around the third pivot hole 168 in a substantial circle having a radius $R_3$ (see also, e.g., FIG. 7). In some embodiments, the phase adjustment holes 166 may be equally spaced apart around the third pivot hole 168. In some embodiments, each phase adjustment hole 166 of the adjustable bracket 160 is configured to receive the adjustment bolt 130 (see, e.g., FIG. 4). As shown in FIG. 4, the third pivot hole 168 of the adjustment bracket 160 aligns with the first pivot hole 128 of the first mounting bracket 120 and the second pivot hole 148 of the second mounting bracket 140 and is configured to receive the pivot bolt 132.

The at least one adjustment bracket 160 further comprises a second set of antenna adjustment holes 165. Each antenna adjustment hole 165 corresponds with an antenna adjustment hole 145 of the second mounting bracket 140 which corresponds to a different length common platform antenna model (e.g., A/B/C/D antenna models). Each of antenna adjustment hole 165 of the adjustment bracket 160 is configured to receive the adjustment pin 134 and is configured to align with a corresponding antenna adjustment hole 145 of the second mounting bracket 140 (see, e.g., FIG. 4, FIG. 8B, FIG. 9B, FIG. 10B, and FIG. 11B). As shown in FIG. 3C, in some embodiments, the adjustment bracket 160 comprises four (4) antenna adjustment holes 165.

Figure 3D:
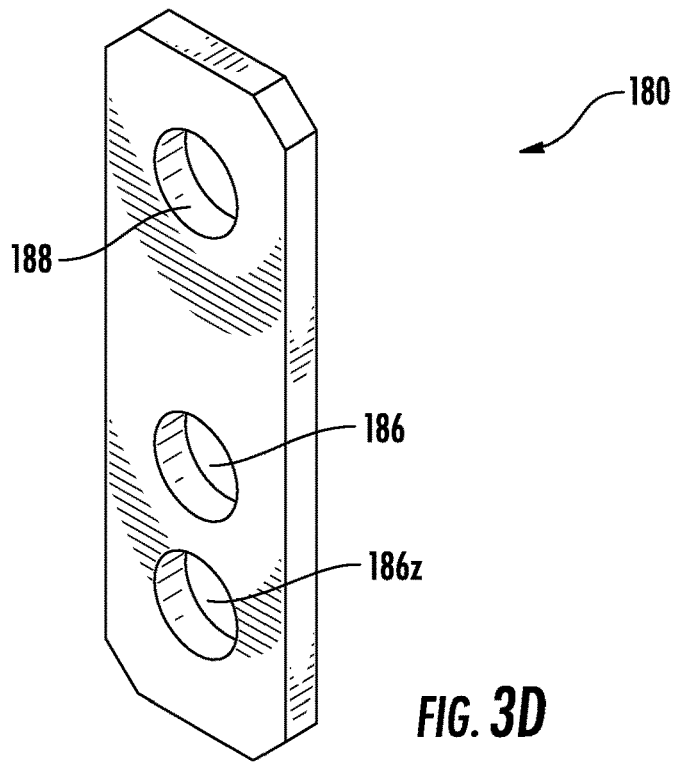
FIG. 3D is a perspective view of a locking plate of the antenna mount kit of FIG. 2.

The antenna mount kit 100 of the present invention further comprises at least one locking plate 180. In some embodiments, the antenna mount kit 100 may comprise two locking plates 180. A locking plate 180 according to embodiments of the present invention is illustrated in FIG. 3D. As shown in FIG. 3D, the at least one locking plate comprises a fourth pivot hole 188 and at least one phase adjustment hole 186. The at least one phase adjustment hole 186 is configured to receive the adjustment bolt 130. In some embodiments, the locking plate 180 may further comprise a zero degree phase adjustment hole 186z. The zero degree phase adjustment hole 186z of the locking plate 180 is configured to align with the zero degree phase adjustment hole 146z of the second mounting bracket 140 and the zero degree phase adjustment hole 126z of the first mounting bracket 120 to allow the antenna mount kit 100 to be locked at a zero degree tilt angle (see, e.g., FIGS. 6A-6C).

Referring now to FIG. 4, the fourth pivot hole 188 of the locking plate 180 is configured such that it may be aligned with the first, second, and third pivot holes 128, 148, 168 described above and is configured to receive the pivot bolt 132 at a center pivot point (P). As shown in FIG. 4, when the first mounting bracket 120, the second mounting bracket 140, the adjustable bracket 160, and the locking plate 180 are pivotally coupled together at the center pivot point (P) by the pivot bolt 132, the locking plate 180 is may be rotated 360 degrees around the center pivot point (P) such that the at least one phase adjustment hole 186 may be aligned with one of the phase adjustment holes 166 of the adjustable bracket 160 and one of the phase adjustment holes 126 of the first mounting bracket 120.

As discussed in further detail below, when the at least one phase adjustment hole 186 of the locking plate 180 is aligned with one of the phase adjustment holes 126 in the first mounting bracket 120 and one of the phase adjustment holes 166 in the adjustment bracket 160, an adjustment bolt 130 may be inserted through the aligned holes 126, 166, 186 to lock the antenna mount kit 100 at the tilt angle (α) corresponding to the phase adjustment holes 126, 166 of the first mounting bracket 120 and the adjustment bracket 160, respectively. See also, e.g., Tables 3-6.

As discussed above, in some embodiments, the first mounting bracket 120, second mounting bracket 140, and locking plate 180 may each comprise a zero degree phase adjustment hole 126z, 146z, 186z. When the zero degree phase adjustment holes 126z, 146z, 186z of the first mounting bracket 120, second mounting bracket 140, and locking plate 180 are aligned, an adjustment bolt 130 (or other equivalent locking mechanism) may be inserted through the aligned holes 126z, 146z, 186z to lock the antenna mount kit 100 at a zero degree tilt angle.

Figure 5:
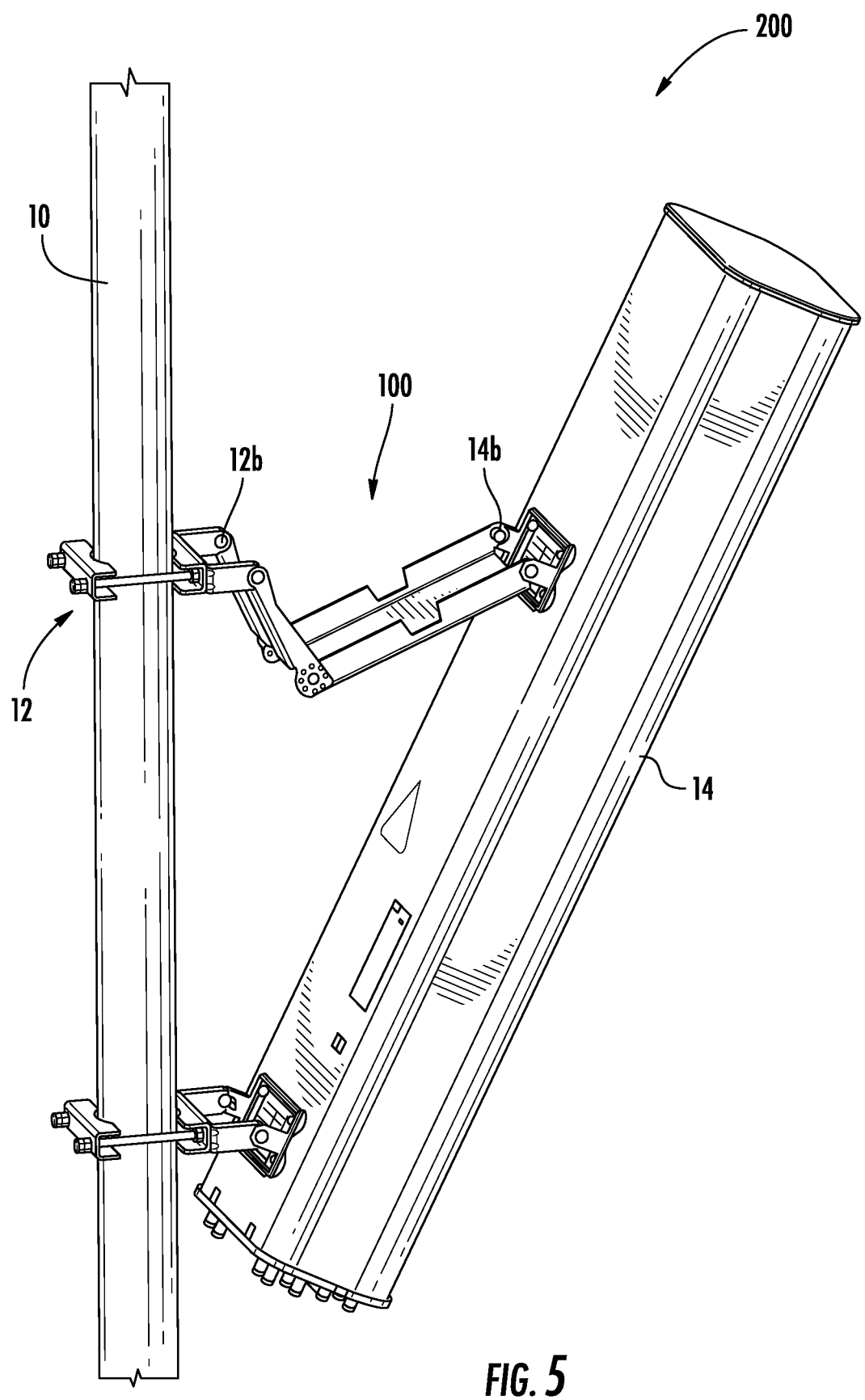
FIG. 5 is a perspective view of an antenna mount kit assembly according to embodiments of the present invention.

An antenna mount kit assembly 200 is also provided and illustrated in FIG. 5. The antenna mount kit assembly 200 may comprise a mounting structure 10 (e.g., a pole or antenna tower), a pipe clamp 12 configured to be secured to the mounting structure 10, an antenna 14, and an antenna mount kit 100 according to embodiments of the present invention described above. In some embodiments, the first mounting bracket 120 of the antenna mount kit 100 is mounted to the pipe clamp 12 and the second mounting bracket 140 is mounted to the antenna 14. In some embodiments, the adjustment pin 134 is inserted through the antenna adjustment hole 145 of the second mounting bracket 140 and a respective antenna adjustment hole 165 of the adjustable bracket 160 corresponding to the length of the antenna 14 (e.g., models A/B/C/D) mounted to the antenna mount kit 100. In some embodiments, an adjustment bolt 130 is inserted through one phase adjustment hole 126 of the first mounting bracket 120, the slot 146 of the second mounting bracket 140, one phase adjustment hole 166 of the adjustable bracket 160, and the phase adjustment hole 186 of the locking plate 180 to lock the antenna 14 at the desired tilt angle corresponding to the phase adjustment holes 126, 166 (see, e.g., Tables 3-6).

Figure 6A:
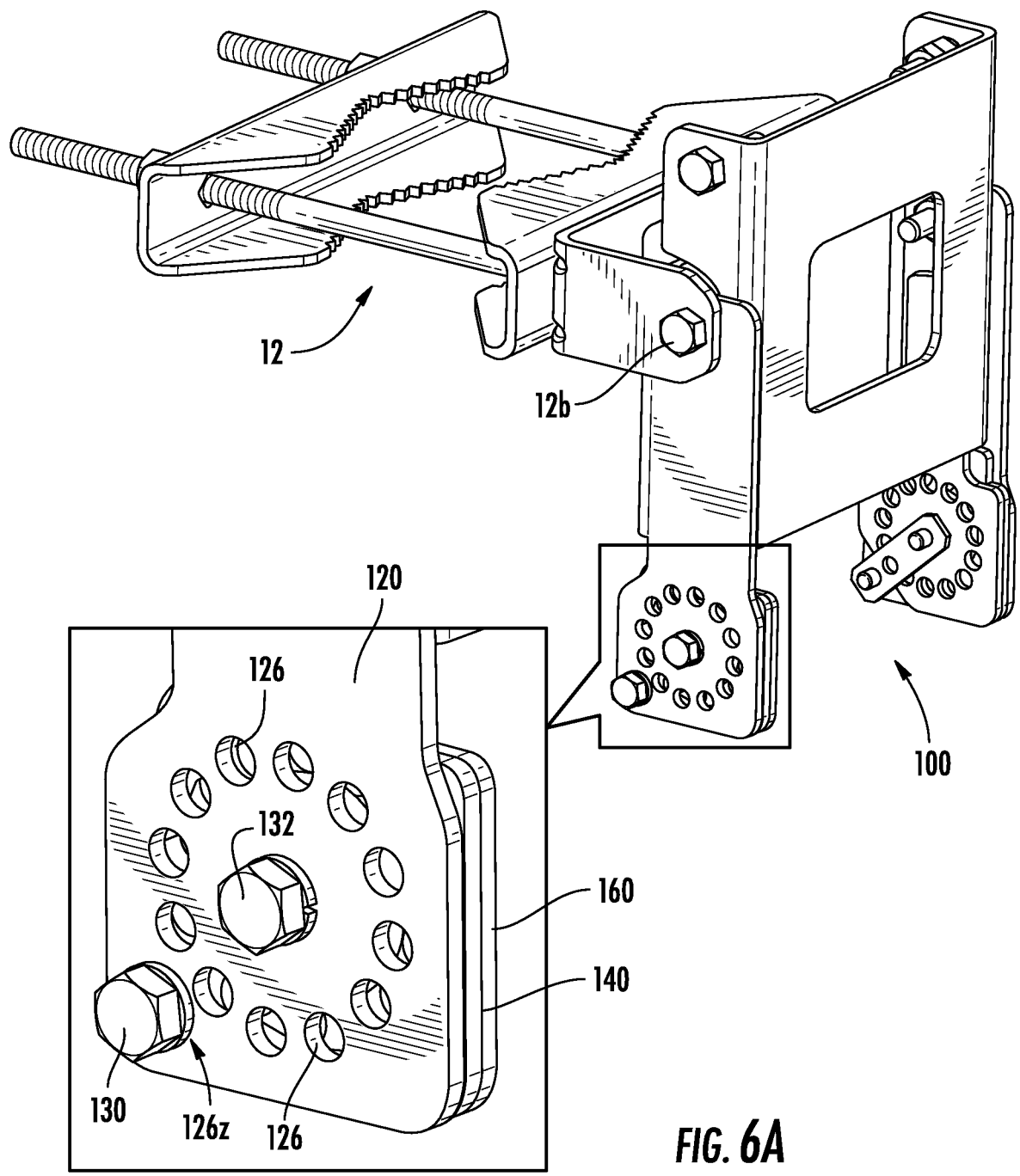
FIG. 6A is an enlarged view of the antenna mount kit of FIG. 2 locked at a zero degree tilt angle according to embodiments of the present invention.
Figure 6B:
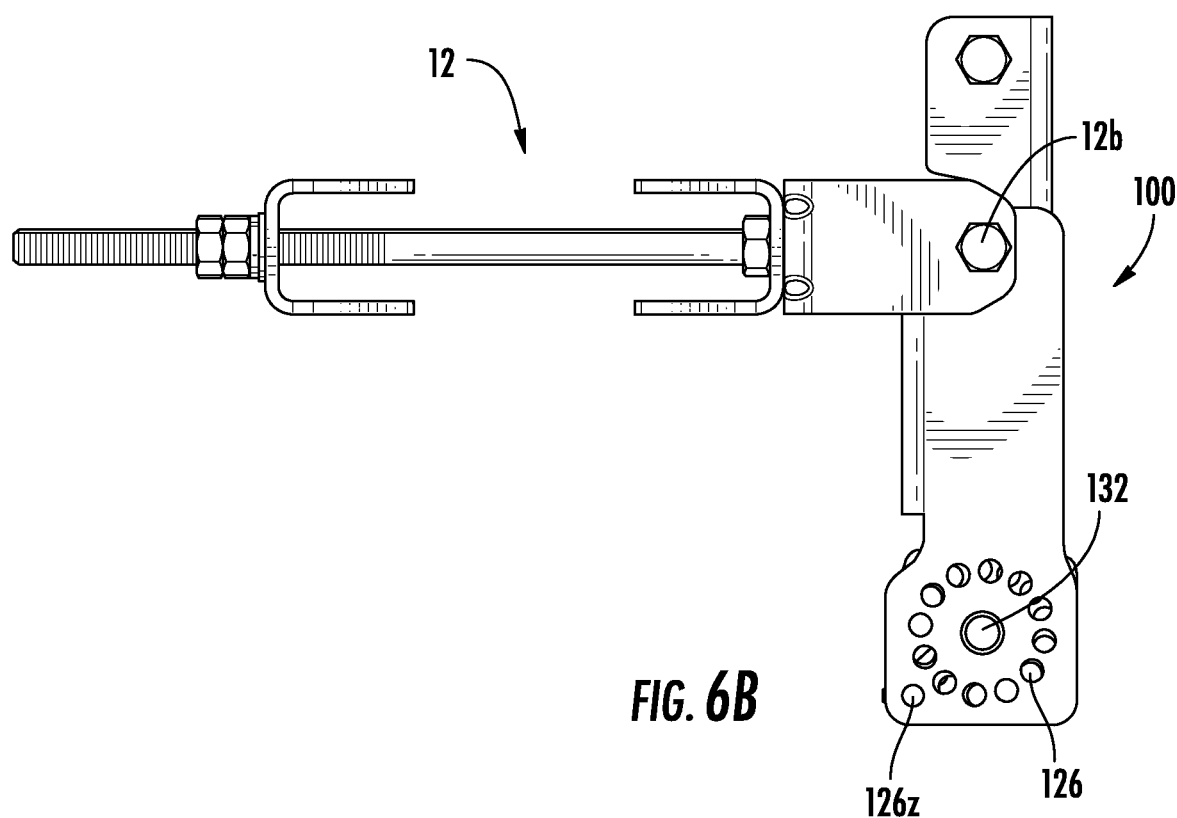
FIG. 6B is a side view of the antenna mount kit of FIG. 6A illustrating the alignment of the zero degree phase adjustment holes of the first and second mounting brackets when the antenna mount kit is positioned at a zero degree of tilt angle.
Figure 6C:
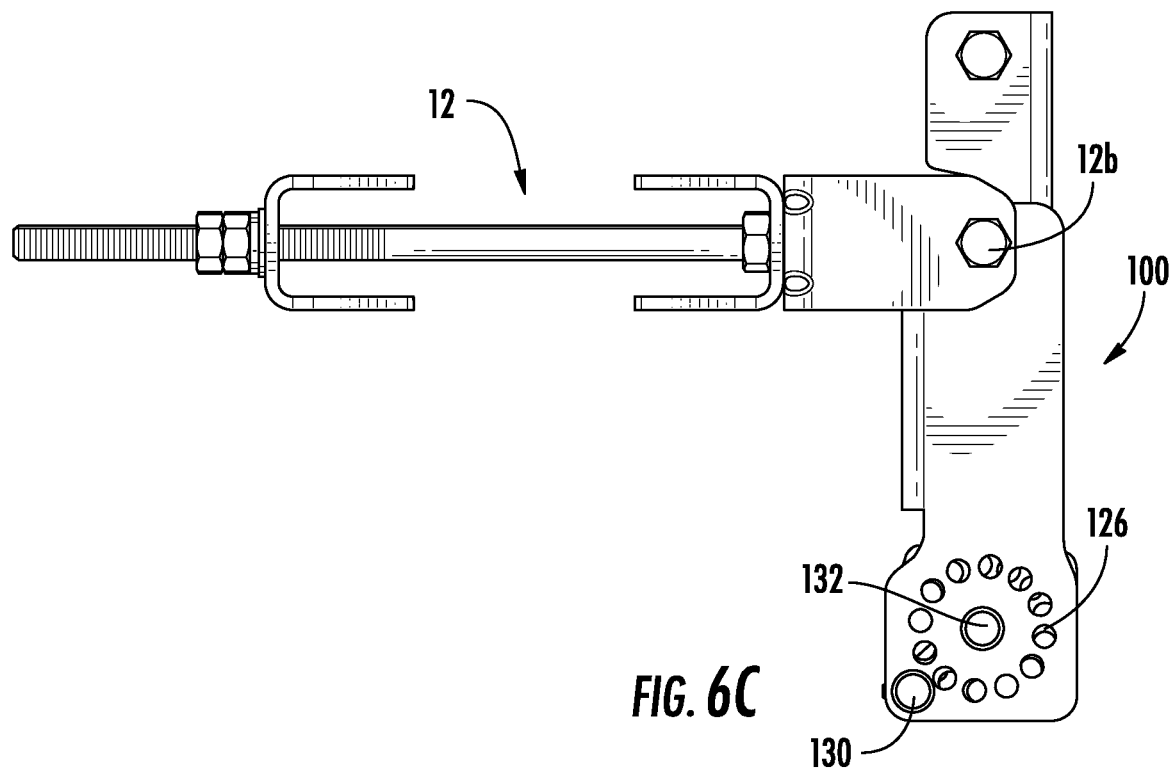
FIG. 6C is a side view of the antenna mount kit of FIG. 6B with an adjustment bolt inserted through the zero degree phase adjustment holes of the first and second mounting brackets according to embodiments of the present invention.

FIGS. 6A-6C show the antenna mount kit 100 of the present invention locked at a zero degree tilt angle. As shown in FIG. 6A, in some embodiments, when pivotally coupled together, the second mounting bracket 140 resides between the first mounting bracket 120 and the adjustable bracket 160. FIG. 6B shows the zero degree phase adjustment holes 126z, 146z, 186z aligned prior to inserting the adjustment bolt 130. FIG. 6C shows an adjustment bolt 130 inserted through the phase adjustment holes 126z, 146z, 186z to lock the antenna mount kit 100 in place (i.e., at a zero degree tilt angle).

Figure 7:
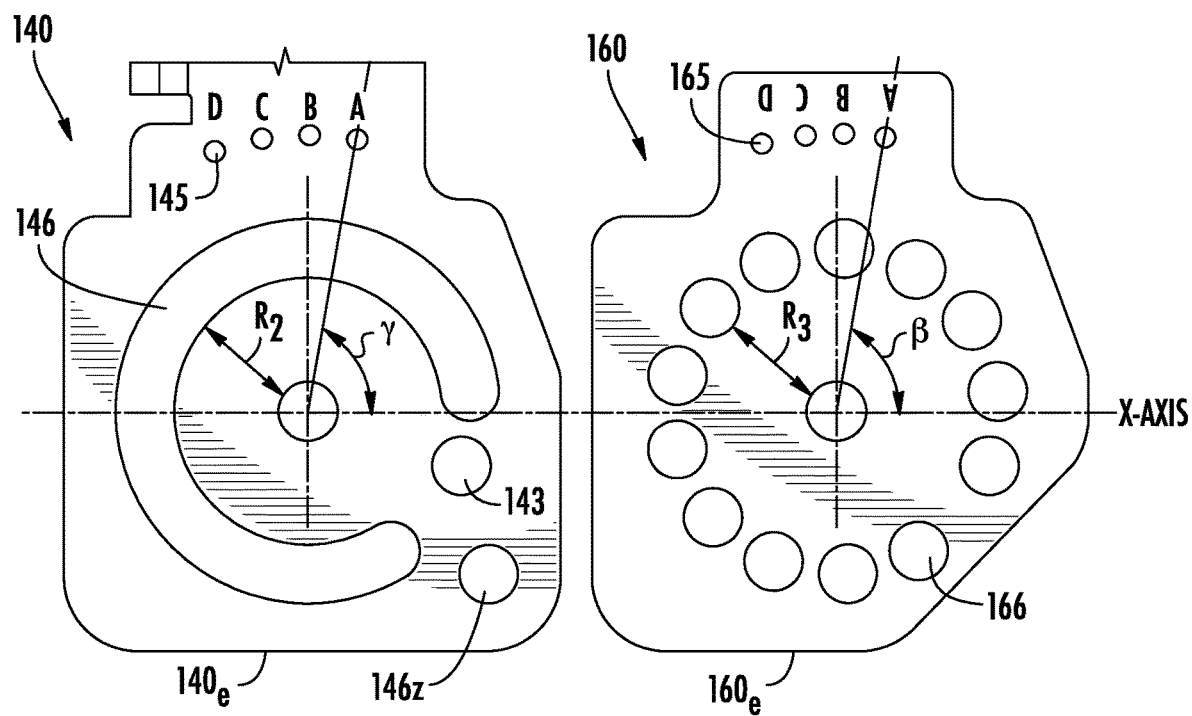
FIG. 7 illustrates the different angles in which the antenna adjustment holes are located in the second mounting bracket and the adjustable bracket relative to an X-axis through the second and third pivot holes, respectively.

As discussed above, the second mounting bracket 140 and the adjustable bracket 160 each comprise a plurality of antenna adjustment holes 145, 165. As shown in FIG. 7, the second mounting bracket 140 and the adjustable bracket 160 may each comprise four (4) antenna adjustment holes 145, 165. Each antenna adjustment holes 145, 165 may correspond to a respective length antenna. For example, the second mounting bracket 140 may comprise four antenna adjustment holes 145 each corresponding to a respective A, B, C, and D length antenna 14. Likewise, the adjustable bracket 160 may comprise four (4) antenna adjustment holes 165 each corresponding to a respective A, B, C, and D length antenna 14.

During assembly of the antenna mount kit 100, one of the antenna adjustment holes 165 of the adjustable bracket 160 is aligned with the corresponding antenna adjustment hole 145 of the second mounting bracket 140 for the same length antenna 14 (i.e., the antenna that will be mounted to the second mounting bracket 140). For example, if the antenna mount kit 100 will be used with an "A" length antenna, then the "A" antenna adjustment holes 145, 165 of the second mounting bracket 140 and the adjustable bracket 160 should be aligned. Once aligned, an adjustment pin 134 (or bolt) is then inserted through the adjustment holes 145, 165 to lock the brackets 140, 160 in place for that particular length antenna.

Still referring to FIG. 7, in some embodiments, the antenna adjustment holes 145 of the second mounting bracket 140 may be located at angles (γ) in a range of about 80° to about 110° relative to an X-axis through the second pivot hole 148 (when in the orientation shown in FIG. 7). As shown in FIG. 7, the X-axis is parallel to a bottom edge 140e of the second mounting bracket 140 (i.e., when the antenna mount kit 100 is at a zero degree tilt angle (θ)). For example, in some embodiments, the antenna adjustment hole 145 for an "A" length antenna 14 is located at an angle (γ) of 80° relative to the X-axis through the second pivot hole 148. In some embodiments, the antenna adjustment hole 145 for a "B" length antenna 14 is located at an angle (γ) of 90° relative to the X-axis through the second pivot hole 148. In some embodiments, the antenna adjustment hole 145 for a "C" length antenna 14 is located at an angle (γ) of 100° relative to the X-axis through the second pivot hole 148. In some embodiments, the antenna adjustment hole 145 for a "D" length antenna 14 is located at an angle (γ) of 110° relative to the X-axis through the second pivot hole 148.

In some embodiments, the antenna adjustment holes 165 of the adjustable bracket 160 may be located at angles (β) in a range of about 80° to about 106° relative to an X-axis through the third pivot hole 168 (when in the orientation shown in FIG. 7). As shown in FIG. 7, the X-axis is parallel to a bottom edge 160e of the adjustable bracket 160 (i.e., when the antenna mount kit 100 is at a zero degree tilt angle (θ)). For example, in some embodiments, the antenna adjustment hole 165 for an "A" length antenna 14 is located at an angle (β) of 80° relative to the X-axis through the third pivot hole 168. In some embodiments, the antenna adjustment hole 165 for a "B" length antenna 14 is located at an angle (β) of 88.6° relative to the X-axis through the third pivot hole 168. In some embodiments, the antenna adjustment hole 165 for a "C" length antenna 14 is located at an angle (β) of 96.5° relative to the X-axis through the third pivot hole 168. In some embodiments, the antenna adjustment hole 165 for a "D" length antenna 14 is located at an angle (β) of 105.7° relative to the X-axis through the third pivot hole 168.

Figure 8A:
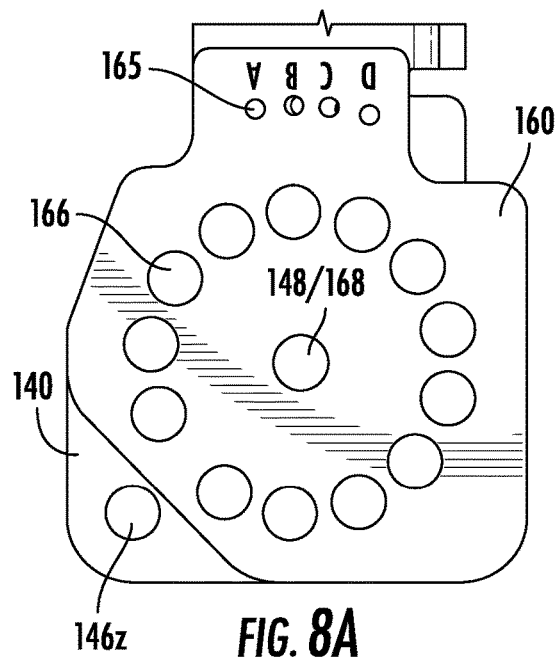
FIG. 8A illustrates the alignment of the phase adjustment holes of the adjustable bracket and the slot of the second mounting bracket when the antenna mount kit is used with an "A" length antenna.
Figure 8B:
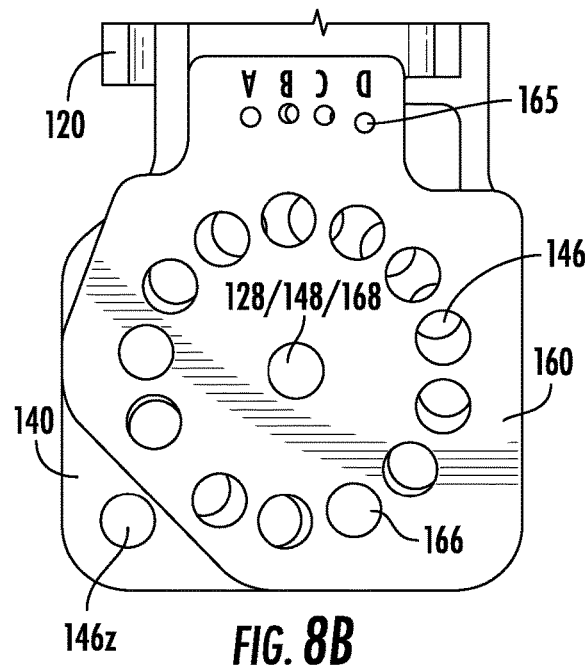
FIG. 8B illustrates the alignment of the phase adjustment holes of the first mounting bracket, the phase adjustment holes of adjustable bracket, and the slot of the second mounting bracket for the antenna mount kit of FIG. 8A.
Figure 9A:
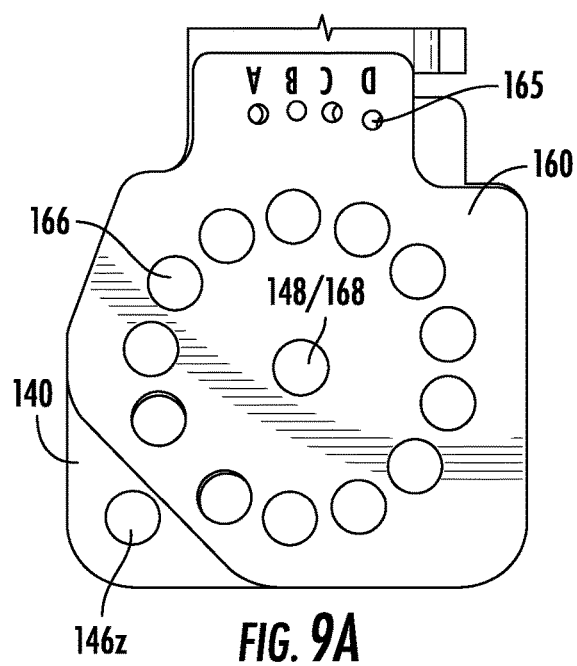
FIG. 9A illustrates the alignment of the phase adjustment holes of the adjustable bracket and the slot of the second mounting bracket when the antenna mount kit is used with a "B" length antenna.
Figure 9B:
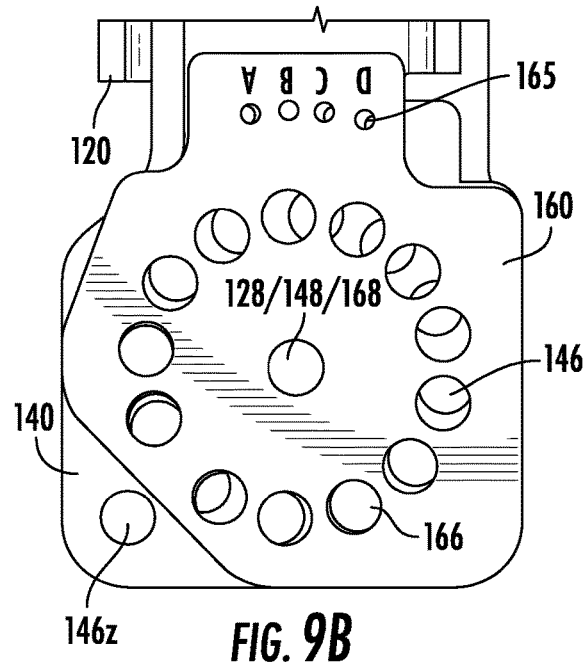
FIG. 9B illustrates the alignment of the phase adjustment holes of the first mounting bracket, the phase adjustment holes of the adjustable bracket, and the slot of the second mounting bracket for the antenna mount kit of FIG. 9A.
Figure 10A:
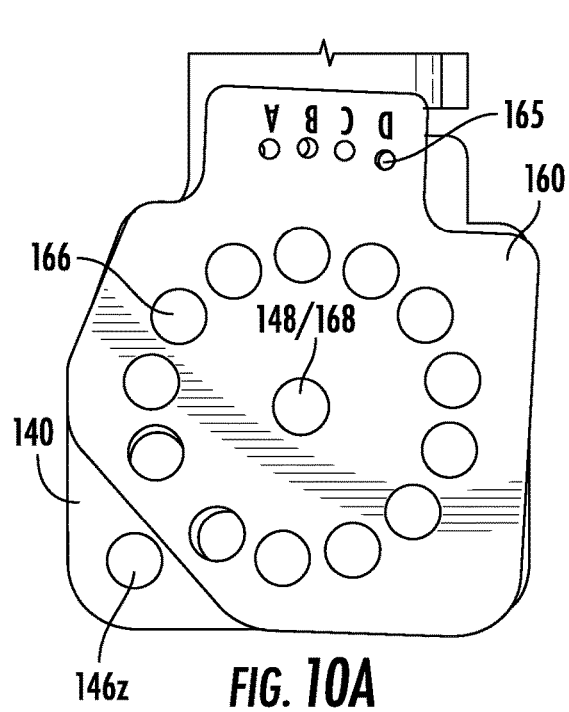
FIG. 10A illustrates the alignment of the phase adjustment holes of the adjustable bracket and the slot of the second mounting bracket when the antenna mount kit is used with a "C" length antenna.
Figure 10B:
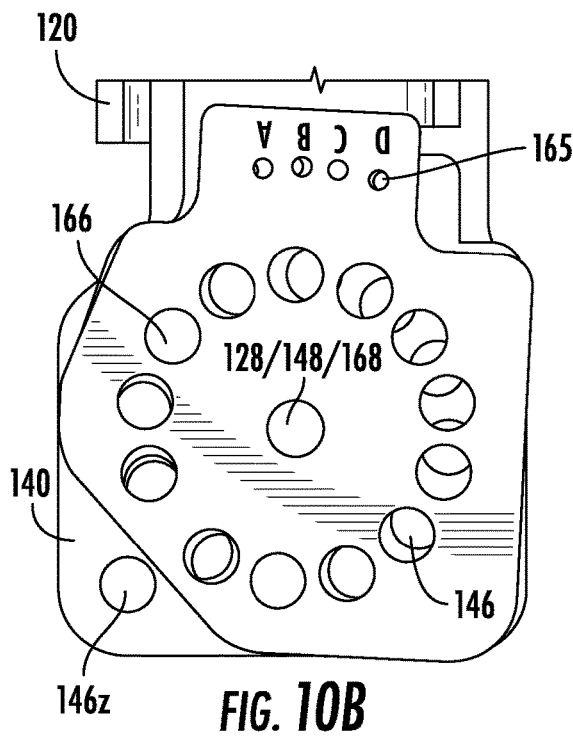
FIG. 10B illustrates the alignment of the phase adjustment holes of the first mounting bracket, the phase adjustment holes of the adjustable bracket, and the slot of the second mounting bracket for the antenna mount kit of FIG. 10A.
Figure 11A:
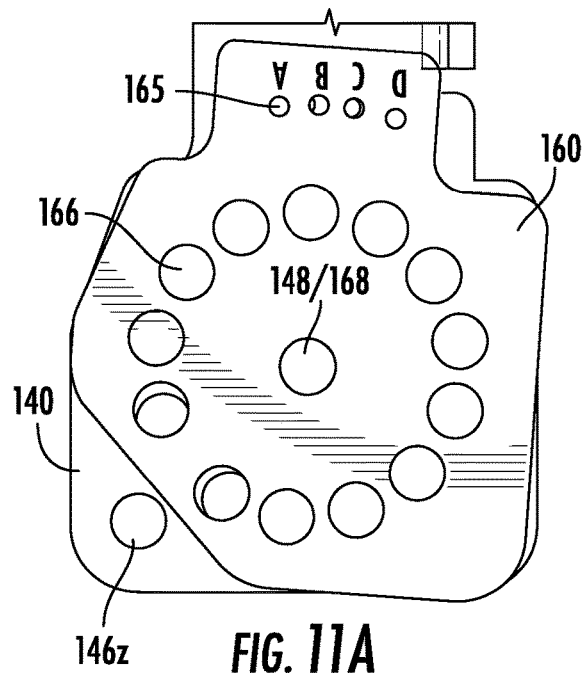
FIG. 11A illustrates the alignment of the phase adjustment holes of the adjustable bracket and the slot of the second mounting bracket when the antenna mount kit is used with a "D" length antenna.
Figure 11B:
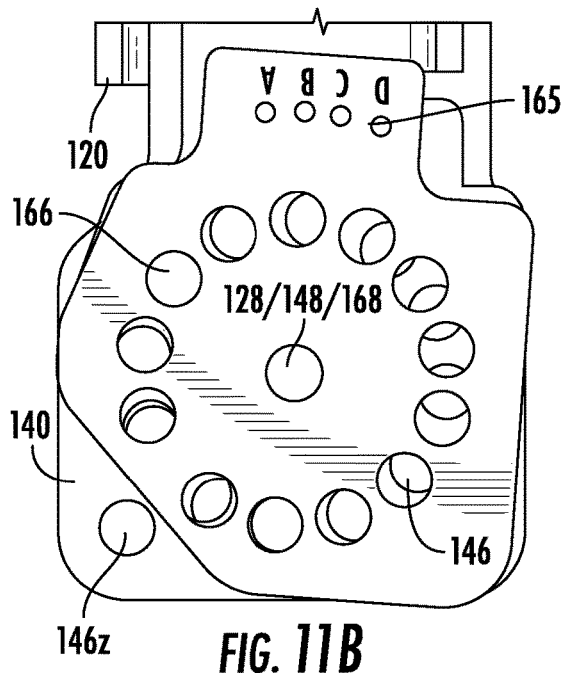
FIG. 11B illustrates the alignment of the phase adjustment holes of the first mounting bracket, the phase adjustment holes for the adjustable bracket, and the slot of the second mounting bracket for the antenna mount kit of FIG. 11A.
Figure 12:
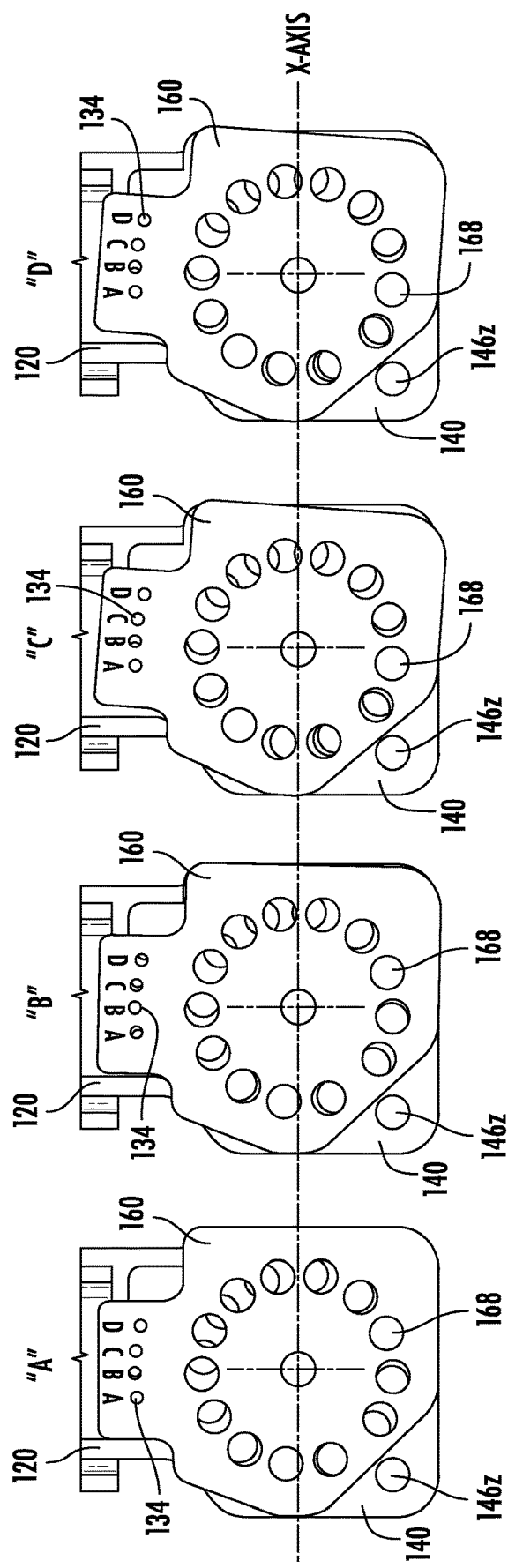
FIG. 12 compares the alignment of the phase adjustment holes for the first mounting bracket and the adjustable bracket, and the slot of the second mounting bracket, at a zero degree tilt angle for "A", "B", "C", and "D" length antennas.

FIGS. 8A-12 illustrate the alignment of the phase adjustment holes 126, 166 when the antenna mount kit 100 of the present invention is used with different length antennas 14 (e.g., A, B, C, and D length antennas 14). FIG. 8A illustrates the alignment of the phase adjustment holes 166 of the adjustable bracket 160 and the slot 146 of the second mounting bracket 140 when the antenna mount kit 100 of the present invention is used with an "A" length antenna 14. FIG. 8B illustrates the alignment of the phase adjustment holes 126 of the first mounting bracket 120, the phase adjustment holes 166 of adjustable bracket 160, and the slot 146 of the second mounting bracket 140 for the antenna mount kit 100. FIG. 9A illustrates the alignment of the phase adjustment holes 166 of the adjustable bracket 160 and the slot 146 of the second mounting bracket 140 when the antenna mount kit 100 of the present invention is used with a "B" length antenna 14. FIG. 9B illustrates the alignment of the phase adjustment holes 126 of the first mounting bracket 120, the phase adjustment holes 166 of the adjustable bracket 160, and the slot 146 of the second mounting bracket 140 for the antenna mount kit 100. FIG. 10A illustrates the alignment of the phase adjustment holes 166 of the adjustable bracket 160 and the slot 146 of the second mounting bracket 140 when the antenna mount kit 100 of the present invention is used with a "C" length antenna 14. FIG. 10B illustrates the alignment of the phase adjustment holes 126 of the first mounting bracket 120, the phase adjustment holes 166 of the adjustable bracket 160, and the slot 146 of the second mounting bracket 140 for the antenna mount kit 100. FIG. 11A illustrates the alignment of the phase adjustment hole 166 of the adjustable bracket 160 and the slot 146 of the second mounting bracket 140 when the antenna mount kit 100 of the present invention is used with a "D" length antenna 14. FIG. 11B illustrates the alignment of the phase adjustment holes 126 of the first mounting bracket 120, the phase adjustment holes 166 for the adjustable bracket 160, and the slot 146 of the second mounting bracket 140 for the antenna mount kit 100. FIG. 12 compares the alignment of the phase adjustment holes 126, 166 for the first mounting bracket 120 and the adjustable bracket 160, and the slot 146 of the second mounting bracket 140, at a zero degree tilt angle for "A", "B", "C", and "D" length antennas 14.

Methods of adjusting the downtilt of an antenna are also provided. In some embodiments, the methods may include providing an antenna mount kit 100 according to embodiments of the present invention, rotating the adjustable bracket 160 and locking plate 180 of the antenna mount kit 100 around the center pivot point (P) such that one of the phase adjustment holes 166 of the adjustable bracket 160 and the phase adjustment hole 186 of the locking plate 180 align with the slot 146 of the second mounting bracket 140 and one of the phase adjustment holes 126 of the first mounting bracket 120 for the desired tilt angle (θ), and inserting the adjustment bolt 130 through the aligned phase adjustment holes 126, 166 and slot 146, thereby locking the antenna 14 at the desired tilt angle (θ).

In some embodiments, methods of the present invention may include removing the adjustment bolt 130 from the phase adjustment holes 126, 166 and slot 146 to unlock the antenna 14 from a set tilt angle (θ), rotating the adjustable bracket 160 and locking plate 180 around the center pivot point (P) such that the same or a different phase adjustment hole 166 of the adjustable bracket 160 and the phase adjustment hole 186 of the locking plate 180 align with the slot 146 of the second mounting bracket 140 and the same or a different phase adjustment hole 126 of the first mounting bracket 120 for a different desired tilt angle (θ), and reinserting the adjustment bolt 130 through the newly aligned phase adjustment holes 126, 166 and slot 146, thereby locking the antenna 14 a new desired tilt angle (θ).

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

TABLE 1

Unified Dimensions for A/B/C/D Length CP Antenna Models

| CP ANTENNA | | A | B | C | D |
|---|---|---|---|---|---|
| STANDARD ANTENNA LENGTH/mm | | 1400 | 1828 | 2438 | 2688 |
| MOUNTING POINTS POSITION | L1/mm | 120 | 210 | 310 | 360 |
| | L2/mm | 921 | 1165 | 1536 | 1679 |
| | L3/mm | 359 | 453 | 592 | 649 |
| MAX TILT/Degree | | 22.7 | 17.8 | 13.4 | 12.2 |
| REFLECTOR LENGTH | | 1360 | 1800 | 2408 | 2658 |
| DISTANCE BETWEEN REFLECTOR TOP END TO TOP ENDCAP | | 22 | 10 | 12 | 12 |
| DISTANCE BETWEEN 1st DIPOLE to BOTTOM ENDCAP | | 180 | 128 | 180 | 180 |

TABLE 2

Tilt Angle versus Scissor Bracket Angle for CP Antennas

| Tilt Angle | Angle between scissor brackets for different length of Antennas | | | |
|---|---|---|---|---|
| | A | B | C | D |
| 0 | 0.00 | 0.00 | 0.00 | 0.00 |
| 1 | 5.08 | 6.48 | 8.61 | 9.41 |
| 2 | 10.16 | 12.97 | 17.27 | 18.89 |
| 3 | 15.27 | 19.51 | 26.02 | 28.50 |
| 4 | 20.40 | 26.12 | 34.94 | 38.32 |
| 5 | 25.58 | 32.81 | 44.07 | 48.43 |
| 6 | 30.80 | 39.61 | 53.51 | 58.96 |
| 7 | 36.09 | 46.56 | 63.35 | 70.07 |
| 8 | 41.46 | 53.69 | 73.74 | 81.99 |
| 9 | 46.93 | 61.05 | 84.88 | 95.09 |
| 10 | 52.50 | 68.70 | 97.12 | 110.09 |
| 11 | 58.21 | 76.71 | 111.05 | 128.66 |
| 12 | 64.07 | 85.17 | 128.07 | 158.81 |
| 13 | 70.12 | 94.26 | 153.65 | |
| 14 | 76.40 | 104.18 | | |
| 15 | 82.96 | 115.35 | | |
| 16 | 89.86 | 128.58 | | |
| 17 | 97.19 | 146.24 | | |
| 18 | 105.09 | | | |
| 19 | 133.77 | | | |
| 20 | 123.57 | | | |
| 21 | 135.27 | | | |
| 22 | 151.06 | | | |

TABLE 3

Tilt Angle versus Angle of Scissor Bracket for "A" Length Antenna

| Tilt Angle of Antenna | Angle of Scissor Bracket |
|---|---|
| 0 | 0.00 |
| 1 | 5.08 |
| 2 | 10.16 |
| 3 | 15.27 |
| 4 | 20.40 |

TABLE 3-continued

Tilt Angle versus Angle of Scissor Bracket for "A" Length Antenna

| | | | | | |
|---|---|---|---|---|---|
| | 5 | | 25.58 | | |
| | 6 | | 30.80 | | |
| | 7 | | 36.09 | | |
| | 8 | | 41.46 | | |
| | 9 | | 46.93 | | |
| | 10 | | 52.50 | | |
| | 11 | | 58.21 | | |
| | 12 | | 64.07 | | |
| | 13 | | 70.12 | | |
| | 14 | | 76.40 | | |
| | 15 | | 82.06 | | |
| | 16 | | 89.86 | | |
| | 17 | | 97.19 | | |
| | 18 | | 105.09 | | |
| | 19 | | 113.77 | | |
| | 20 | | 123.57 | | |
| | 21 | | 135.27 | | |
| | 22 | | 151.06 | | |

| Hole No. on Bracket 1 | Angle of Holes on Bracket 1 @ 0 deg tilt | Hole No. on Bracket 2 | Angle of Holes on Bracket 2 @ 0 deg tilt | Angle of Holes on Bracket 2 @ 1 deg tilt | Angle of Holes on Bracket 2 @ 2 deg tilt | Angle of Holes on Bracket 2 @ 3 deg tilt |
|---|---|---|---|---|---|---|
| 1 | 0 | 1 | 0.0 | 5.1 | 10.2 | 15.3 |
| 2 | 30 | 2 | 24.9 | 30.0 | 35.1 | 40.2 |
| 3 | 60 | 3 | 43.8 | 54.9 | 60.0 | 65.1 |
| 4 | 90 | 4 | 74.7 | 79.8 | 84.9 | 90.0 |
| 5 | 120 | 5 | 99.6 | 104.7 | 109.8 | 114.9 |
| 6 | 150 | 6 | 124.4 | 129.5 | 134.6 | 139.7 |
| 7 | 180 | 7 | 149.2 | 154.3 | 159.4 | 164.5 |
| 8 | 210 | 8 | 173.9 | 179.0 | 184.1 | 189.2 |
| 9 | 240 | 9 | 198.5 | 203.5 | 208.7 | 213.8 |
| 10 | 270 | 10 | 223.1 | 228.2 | 233.2 | 238.3 |
| 11 | 300 | 11 | 247.5 | 252.6 | 257.7 | 262.8 |
| 12 | 330 | 12 | 271.8 | 276.9 | 282.0 | 287.1 |
| | | 13 | 295.9 | 301.0 | 306.1 | 311.2 |

| Angle of Holes on Bracket 2 @ 4 deg tilt | Angle of Holes on Bracket 2 @ 5 deg tilt | Angle of Holes on Bracket 2 @ 6 deg tilt | Angle of Holes on Bracket 2 @ 7 deg tilt | Angle of Holes on Bracket 2 @ 8 deg tilt | Angle of Holes on Bracket 2 @ 9 deg tilt |
|---|---|---|---|---|---|
| 20.4 | 25.6 | 30.8 | 36.1 | 41.5 | 46.9 |
| 45.3 | 50.5 | 55.7 | 61.0 | 66.4 | 71.8 |
| 70.2 | 75.4 | 60.6 | 85.9 | 91.3 | 96.8 |
| 95.1 | 100.3 | 105.5 | 110.8 | 116.2 | 121.7 |
| 120.0 | 125.2 | 130.4 | 135.7 | 141.1 | 146.5 |
| 144.8 | 150.0 | 155.2 | 160.5 | 165.9 | 171.3 |
| 169.6 | 174.3 | 180.0 | 185.3 | 190.7 | 196.1 |
| 194.3 | 199.5 | 204.7 | 210.0 | 215.4 | 220.8 |
| 218.9 | 224.1 | 229.8 | 234.6 | 240.0 | 245.5 |
| 243.5 | 248.7 | 253.9 | 259.2 | 264.5 | 270.0 |
| 267.9 | 273.1 | 278.3 | 283.6 | 289.0 | 294.4 |
| 292.2 | 297.4 | 302.6 | 307.9 | 313.3 | 318.7 |
| 316.3 | 321.5 | 326.7 | 332.0 | 337.4 | 342.9 |

| Angle of Holes on Bracket 2 @ 10 deg tilt | Angle of Holes on Bracket 2 @ 11 deg tilt | Angle of Holes on Bracket 2 @ 12 deg tilt | Angle of Holes on Bracket 2 @ 13 deg tilt | Angle of Holes on Bracket 2 @ 14 deg tilt | Angle of Holes on Bracket 2 @ 15 deg tilt | Angle of Holes on Bracket 2 @ 16 deg tilt |
|---|---|---|---|---|---|---|
| 52.5 | 58.2 | 64.1 | 70.1 | 76.4 | 83.0 | 89.9 |
| 77.4 | 83.1 | 89.0 | 95.0 | 101.3 | 107.9 | 114.8 |
| 102.3 | 108.0 | 113.9 | 120.0 | 126.2 | 132.8 | 139.7 |
| 127.2 | 132.9 | 138.8 | 144.9 | 151.1 | 157.7 | 164.6 |
| 152.1 | 157.8 | 163.7 | 169.7 | 176.0 | 182.6 | 189.5 |
| 176.9 | 182.5 | 188.5 | 194.5 | 200.8 | 207.4 | 214.3 |
| 201.7 | 207.4 | 213.3 | 219.3 | 225.6 | 232.2 | 239.1 |
| 226.4 | 232.1 | 238.0 | 244.0 | 250.3 | 256.9 | 263.8 |
| 251.0 | 256.7 | 262.6 | 268.7 | 274.9 | 281.5 | 289.4 |
| 275.6 | 281.3 | 287.1 | 293.2 | 299.5 | 306.0 | 312.9 |
| 300.0 | 305.7 | 311.6 | 317.6 | 323.9 | 330.5 | 337.4 |
| 324.3 | 330.0 | 335.9 | 341.9 | 348.2 | 354.8 | 361.7 |
| 348.4 | 354.1 | 360.0 | 365.1 | 372.3 | 378.9 | 385.8 |

TABLE 3-continued

Tilt Angle versus Angle of Scissor Bracket for "A" Length Antenna

| Angle of Holes on Bracket 2 @ 17 deg tilt | Angle of Holes on Bracket 2 @ 18 deg tilt | Angle of Holes on Bracket 2 @ 19 deg tilt | Angle of Holes on Bracket 2 @ 20 deg tilt | Angle of Holes on Bracket 2 @ 20 deg tilt | Angle of Holes on Bracket 2 @ 22 deg tilt |
|---|---|---|---|---|---|
| 97.2 | 105.1 | 113.8 | 123.6 | 135.3 | 151.1 |
| 122.1 | 130.0 | 138.7 | 148.5 | 160.2 | 176.0 |
| 147.0 | 154.9 | 163.6 | 173.4 | 185.1 | 200.9 |
| 171.9 | 179.8 | 188.5 | 198.3 | 210.0 | 225.8 |
| 196.8 | 204.7 | 213.4 | 223.2 | 234.9 | 250.7 |
| 221.6 | 229.5 | 238.2 | 248.0 | 259.7 | 275.5 |
| 245.4 | 254.3 | 263.0 | 272.8 | 284.5 | 300.3 |
| 271.1 | 279.0 | 287.7 | 297.5 | 309.2 | 325.0 |
| 295.7 | 303.6 | 312.3 | 322.1 | 333.8 | 349.6 |
| 320.3 | 326.2 | 336.8 | 346.6 | 358.3 | 374.1 |
| 344.7 | 352.6 | 361.3 | 371.1 | 382.8 | 398.6 |
| 369.0 | 376.9 | 385.6 | 395.4 | 407.1 | 422.9 |
| 393.1 | 401.0 | 409.7 | 419.5 | 431.2 | 447.0 |

TABLE 4

Tilt Angle versus Angle of Scissor Bracket for "B" Length Antenna

| Tilt Angle of Antenna | Angle of Scissor Bracket |
|---|---|
| 0 | 0.00 |
| 1 | 6.48 |
| 2 | 12.97 |
| 3 | 19.51 |
| 4 | 26.12 |
| 5 | 32.81 |
| 6 | 39.61 |
| 7 | 46.56 |
| 8 | 53.69 |
| 9 | 61.05 |
| 10 | 68.70 |
| 11 | 76.71 |
| 12 | 85.17 |
| 13 | 94.26 |
| 14 | 104.18 |
| 15 | 115.35 |
| 16 | 128.58 |
| 17 | 146.24 |

| Hole No. on Bracket 1 | Angle of Holes on Bracket 1 @ 0 deg tilt | Hole No. on Bracket 2 | Angle of Holes on Bracket 2 @ 0 deg tilt | Angle of Holes on Bracket 2 @ 1 deg tilt | Angle of Holes on Bracket 2 @ 2 deg tilt | Angle of Holes on Bracket 2 @ 3 deg tilt |
|---|---|---|---|---|---|---|
| 1 | 0 | 1 | 0.0 | 6.5 | 13.0 | 19.5 |
| 2 | 30 | 2 | 23.5 | 30.0 | 36.5 | 43.0 |
| 3 | 60 | 3 | 47.0 | 53.5 | 60.0 | 66.5 |
| 4 | 90 | 4 | 70.5 | 77.0 | 83.5 | 90.0 |
| 5 | 120 | 5 | 93.9 | 100.4 | 106.5 | 113.4 |
| 6 | 150 | 6 | 117.2 | 123.7 | 130.2 | 136.7 |
| 7 | 180 | 7 | 140.4 | 146.9 | 153.4 | 159.9 |
| 8 | 210 | 8 | 163.4 | 169.9 | 176.4 | 183.0 |
| 9 | 240 | 9 | 186.3 | 152.8 | 199.3 | 205.8 |
| 10 | 270 | 10 | 208.9 | 215.4 | 221.9 | 228.5 |
| 11 | 300 | 11 | 231.3 | 237.8 | 244.3 | 250.8 |
| 12 | 330 | 12 | 253.3 | 259.8 | 266.3 | 272.8 |
|  |  | 13 | 274.8 | 281.3 | 287.8 | 294.3 |

| Angle of Holes on Bracket 2 @ 4 deg tilt | Angle of Holes on Bracket 2 @ 5 deg tilt | Angle of Holes on Bracket 2 @ 6 deg tilt | Angle of Holes on Bracket 2 @ 7 deg tilt | Angle of Holes on Bracket 2 @ 8 deg tilt | Angle of Holes on Bracket 2 @ 9 deg tilt |
|---|---|---|---|---|---|
| 26.1 | 32.8 | 39.6 | 46.6 | 53.7 | 61.1 |
| 49.6 | 56.3 | 63.1 | 70.1 | 77.2 | 84.6 |
| 73.1 | 79.8 | 86.6 | 93.6 | 100.7 | 108.1 |
| 96.6 | 103.3 | 110.1 | 117.0 | 124.2 | 131.5 |
| 120.0 | 126.7 | 133.5 | 140.4 | 147.6 | 154.9 |
| 143.3 | 150.0 | 156.8 | 163.8 | 170.9 | 178.2 |
| 166.5 | 173.2 | 180.0 | 185.9 | 194.1 | 201.4 |
| 189.6 | 196.2 | 203.1 | 210.0 | 217.1 | 224.5 |
| 212.4 | 219.1 | 225.9 | 232.9 | 240.0 | 247.4 |
| 235.1 | 241.8 | 248.6 | 255.5 | 262.6 | 270.0 |

TABLE 4-continued

Tilt Angle versus Angle of Scissor Bracket for "B" Length Antenna

|  |  |  |  |  |  |
|---|---|---|---|---|---|
| 257.4 | 264.1 | 270.9 | 277.9 | 285.0 | 292.4 |
| 279.4 | 286.1 | 292.9 | 299.9 | 307.0 | 314.3 |
| 300.9 | 307.6 | 314.4 | 321.4 | 328.5 | 335.9 |

| Angle of Holes on Bracket 2 @ 10 deg tilt | Angle of Holes on Bracket 2 @ 11 deg tilt | Angle of Holes on Bracket 2 @ 12 deg tilt | Angle of Holes on Bracket 2 @ 13 deg tilt | Angle of Holes on Bracket 2 @ 14 deg tilt | Angle of Holes on Bracket 2 @ 15 deg tilt | Angle of Holes on Bracket 2 @ 16 deg tilt | Angle of Holes on Bracket 2 @ 17 deg tilt |
|---|---|---|---|---|---|---|---|
| 68.7 | 76.7 | 85.2 | 94.3 | 104.2 | 115.3 | 128.6 | 146.2 |
| 92.2 | 100.2 | 108.7 | 117.8 | 127.7 | 138.9 | 152.1 | 169.8 |
| 115.7 | 123.7 | 132.2 | 141.3 | 151.2 | 162.4 | 175.6 | 193.3 |
| 139.2 | 147.2 | 155.7 | 164.7 | 174.7 | 185.8 | 199.1 | 216.7 |
| 162.6 | 170.6 | 179.1 | 188.1 | 198.1 | 209.2 | 222.5 | 240.1 |
| 185.9 | 193.9 | 202.4 | 211.4 | 221.4 | 232.5 | 245.8 | 263.4 |
| 209.1 | 217.1 | 225.6 | 234.6 | 244.6 | 255.7 | 269.0 | 286.6 |
| 232.1 | 240.1 | 248.6 | 257.7 | 267.7 | 278.8 | 292.0 | 309.7 |
| 255.0 | 263.0 | 271.5 | 280.6 | 290.5 | 301.7 | 314.9 | 332.5 |
| 277.6 | 285.7 | 294.1 | 303.2 | 313.1 | 324.3 | 337.5 | 355.2 |
| 300.0 | 308.0 | 316.5 | 325.6 | 335.5 | 346.5 | 359.9 | 377.5 |
| 322.0 | 330.0 | 338.5 | 347.5 | 357.5 | 368.6 | 381.9 | 399.5 |
| 343.5 | 351.5 | 360.0 | 269.1 | 379.0 | 390.2 | 403.4 | 421.1 |

TABLE 5

Tilt Angle versus Angle of Scissor Bracket for "C" Length Antenna

| Tilt Angle of Antenna | Angle of Scissor Bracket |
|---|---|
| 0 | 0.00 |
| 1 | 8.61 |
| 2 | 17.27 |
| 3 | 26.02 |
| 4 | 34.94 |
| 5 | 44.07 |
| 6 | 53.51 |
| 7 | 63.35 |
| 8 | 73.74 |
| 9 | 84.88 |
| 10 | 97.12 |
| 11 | 111.05 |
| 12 | 128.07 |
| 13 | 153.65 |

| Hole No. on Bracket 1 | Angle of Holes on Bracket 1 @ 0 deg tilt | Hole No. on Bracket 2 | Angle of Holes on Bracket 2 @ 0 deg tilt | Angle of Holes on Bracket 2 @ 1 deg tilt | Angle of Holes on Bracket 2 @ 2 deg tilt | Angle of Holes on Bracket 2 @ 3 deg tilt | Angle of Holes on Bracket 2 @ 4 deg tilt | Angle of Holes on Bracket 2 @ 5 deg tilt | Angle of Holes on Bracket 2 @ 6 deg tilt |
|---|---|---|---|---|---|---|---|---|---|
| 1 | 0 | 1 | 0.0 | 8.6 | 17.3 | 26.0 | 34.9 | 44.1 | 53.5 |
| 2 | 30 | 2 | 21.4 | 30.0 | 38.7 | 47.4 | 56.3 | 65.5 | 74.9 |
| 3 | 60 | 3 | 42.7 | 51.3 | 60.0 | 68.8 | 77.7 | 86.8 | 96.2 |
| 4 | 90 | 4 | 64.0 | 72.5 | 81.2 | 90.0 | 98.9 | 108.0 | 117.5 |
| 5 | 120 | 5 | 85.1 | 93.7 | 102.3 | 111.1 | 120.0 | 129.1 | 138.6 |
| 6 | 150 | 6 | 105.9 | 114.5 | 123.2 | 132.0 | 140.9 | 150.8 | 159.4 |
| 7 | 180 | 7 | 126.5 | 135.1 | 143.8 | 152.5 | 161.4 | 170.6 | 180.0 |
| 8 | 210 | 8 | 146.7 | 155.3 | 163.9 | 172.7 | 181.6 | 190.7 | 200.2 |
| 9 | 240 | 9 | 166.3 | 174.9 | 183.5 | 192.3 | 201.2 | 210.3 | 219.8 |
| 10 | 270 | 10 | 185.1 | 193.7 | 202.4 | 211.1 | 220.1 | 229.2 | 238.6 |
| 11 | 300 | 11 | 202.9 | 211.5 | 220.1 | 228.9 | 237.8 | 247.0 | 256.4 |
| 12 | 330 | 12 | 218.9 | 227.6 | 236.2 | 245.0 | 253.9 | 263.0 | 272.5 |
|  |  | 13 | 231.9 | 240.5 | 249.2 | 258.0 | 266.9 | 276.0 | 285.4 |

| Angle of Holes on Bracket 2 @ 7 deg tilt | Angle of Holes on Bracket 2 @ 8 deg tilt | Angle of Holes on Bracket 2 @ 9 deg tilt | Angle of Holes on Bracket 2 @ 10 deg tilt | Angle of Holes on Bracket 2 @ 11 deg tilt | Angle of Holes on Bracket 2 @ 12 deg tilt | Angle of Holes on Bracket 2 @ 13 deg tilt |
|---|---|---|---|---|---|---|
| 63.3 | 73.7 | 84.9 | 97.1 | 111.1 | 128.1 | 153.6 |
| 84.7 | 95.1 | 106.3 | 118.5 | 132.4 | 149.5 | 175.0 |
| 106.1 | 116.5 | 127.6 | 139.9 | 153.8 | 170.8 | 196.4 |
| 127.3 | 137.7 | 148.9 | 161.1 | 175.0 | 192.0 | 217.6 |
| 148.4 | 158.8 | 169.9 | 182.2 | 196.1 | 213.1 | 238.7 |
| 169.3 | 179.7 | 190.8 | 203.0 | 217.0 | 234.0 | 259.6 |
| 189.8 | 200.2 | 211.4 | 223.6 | 237.5 | 254.6 | 280.1 |
| 210.0 | 220.4 | 231.5 | 243.8 | 257.7 | 274.7 | 300.3 |

TABLE 5-continued

Tilt Angle versus Angle of Scissor Bracket for "C" Length Antenna

| | | | | | | |
|---|---|---|---|---|---|---|
| 229.6 | 240.0 | 251.1 | 263.4 | 277.3 | 294.3 | 319.9 |
| 248.5 | 258.9 | 270.0 | 282.2 | 296.2 | 315.2 | 338.8 |
| 266.2 | 276.6 | 287.8 | 300.0 | 313.9 | 331.0 | 356.5 |
| 282.3 | 292.7 | 303.8 | 316.1 | 330.0 | 347.0 | 372.6 |
| 295.3 | 305.7 | 316.8 | 329.0 | 343.0 | 360.0 | 385.6 |

TABLE 6

Tilt Angle versus Angle of Scissor Bracket for "D" Length Antenna

| Tilt Angle of Antenna | Angle of Scissor Brackets |
|---|---|
| 0 | 0.00 |
| 1 | 9.41 |
| 2 | 18.89 |
| 3 | 28.50 |
| 4 | 38.32 |
| 5 | 48.43 |
| 6 | 58.96 |
| 7 | 70.07 |
| 8 | 81.99 |
| 9 | 95.09 |
| 10 | 110.09 |
| 11 | 128.66 |
| 12 | 158.81 |

| Hole No. on Bracket 1 | Angle of Holes on Bracket 1 @ 0 deg tilt | Hole No. on Bracket 2 | Angle of Holes on Bracket 2 @ 0 deg tilt | Angle of Holes on Bracket 2 @ 1 deg tilt | Angle of Holes on Bracket 2 @ 2 deg tilt | Angle of Holes on Bracket 2 @ 3 deg tilt | Angle of Holes on Bracket 2 @ 4 deg tilt | Angle of Holes on Bracket 2 @ 5 deg tilt |
|---|---|---|---|---|---|---|---|---|
| 1 | 0 | 1 | 0.0 | 9.4 | 18.9 | 28.5 | 38.3 | 48.4 |
| 2 | 30 | 2 | 20.6 | 30.0 | 39.5 | 49.1 | 58.9 | 69.0 |
| 3 | 60 | 3 | 41.1 | 50.5 | 60.0 | 69.6 | 79.4 | 89.5 |
| 4 | 90 | 4 | 61.5 | 70.9 | 80.4 | 90.0 | 99.8 | 109.9 |
| 5 | 120 | 5 | 81.7 | 91.1 | 100.6 | 110.2 | 120.0 | 130.1 |
| 9 | 150 | 6 | 101.6 | 111.0 | 120.5 | 130.1 | 139.9 | 150.0 |
| 7 | 180 | 7 | 121.0 | 130.5 | 139.9 | 149.5 | 159.4 | 169.5 |
| 8 | 210 | 8 | 139.9 | 149.3 | 158.8 | 168.4 | 178.2 | 188.4 |
| 9 | 240 | 9 | 158.0 | 167.4 | 176.9 | 186.5 | 196.3 | 206.4 |
| 10 | 270 | 10 | 174.9 | 184.3 | 193.8 | 203.4 | 213.2 | 223.3 |
| 11 | 300 | 11 | 189.9 | 199.3 | 208.8 | 218.4 | 228.2 | 238.3 |
| 12 | 330 | 12 | 201.3 | 210.8 | 220.2 | 229.8 | 239.7 | 249.8 |
| | | 13 | 201.2 | 210.6 | 220.1 | 129.7 | 239.5 | 249.6 |

| Angle of Holes on Bracket 2 @ 6 deg tilt | Angle of Holes on Bracket 2 @ 7 deg tilt | Angle of Holes on Bracket 2 @ 8 deg tilt | Angle of Holes on Bracket 2 @ 9 deg tilt | Angle of Holes on Bracket 2 @ 10 deg tilt | Angle of Holes on Bracket 2 @ 11 deg tilt | Angle of Holes on Bracket 2 @ 12 deg tilt |
|---|---|---|---|---|---|---|
| 59.0 | 70.1 | 82.0 | 95.1 | 110.1 | 128.7 | 158.8 |
| 79.5 | 90.7 | 102.6 | 115.7 | 130.7 | 149.2 | 179.4 |
| 100.1 | 111.2 | 123.1 | 136.2 | 151.2 | 169.8 | 199.9 |
| 120.5 | 131.6 | 143.5 | 156.6 | 171.6 | 190.2 | 220.3 |
| 140.6 | 151.8 | 163.7 | 176.8 | 191.8 | 210.3 | 240.5 |
| 160.5 | 171.6 | 183.6 | 196.7 | 211.7 | 230.2 | 260.4 |
| 180.0 | 191.1 | 203.0 | 216.1 | 231.1 | 249.7 | 279.8 |
| 198.9 | 210.0 | 221.9 | 235.0 | 250.0 | 268.6 | 298.7 |
| 217.0 | 228.1 | 240.0 | 253.1 | 268.1 | 286.7 | 316.8 |
| 233.9 | 245.0 | 256.9 | 270.0 | 285.0 | 303.6 | 333.7 |
| 248.9 | 260.0 | 271.9 | 285.0 | 300.0 | 318.6 | 348.7 |
| 260.3 | 271.4 | 283.3 | 296.4 | 311.4 | 330.0 | 360.2 |
| 260.2 | 271.3 | 263.2 | 296.3 | 311.3 | 329.8 | 360.0 |

That which is claimed is:

1. An antenna mount kit, comprising:
a first mounting bracket configured to be mounted to a pipe clamp, the first mounting bracket comprising a first plurality of phase adjustment holes residing circumferentially around a first pivot hole, wherein each of the first plurality of phase adjustment holes is configured to receive an adjustment bolt and the first pivot hole is configured to receive a pivot bolt;
a second mounting bracket configured to be mounted to an antenna and pivotally coupled to the first mounting bracket at the first pivot hole, the second mounting bracket comprising a first set of antenna adjustment holes configured to receive an adjustment pin, an arcuate slot configured to receive the adjustment bolt, and a second pivot hole configured to receive the pivot bolt, wherein the arcuate slot aligns with the one or more of the first plurality of phase adjustment holes of the first mounting bracket and the second pivot hole aligns with the first pivot hole of the first mounting bracket;

at least one adjustable bracket comprising a second plurality of phase adjustment holes residing circumferentially around a third pivot hole and a second set of antenna adjustment holes that correspond to the first set of antenna adjustment holes of the second mounting bracket, wherein the number of the second plurality of phase adjustment holes in the at least one adjustable bracket does not equal the number of the first plurality of phase adjustment holes in the first mounting bracket, wherein each of the second plurality of phase adjustment holes of the at least one adjustable bracket is configured to receive the adjustment bolt, wherein the third pivot hole aligns with the first and second pivot holes and is configured to receive the pivot bolt, and wherein each of second set of antenna adjustment holes is configured to align with a respective antenna adjustment hole of the first set of antenna adjustment holes of the second mounting bracket and receive the adjustment pin; and at least one locking plate comprising a fourth pivot hole and at least one phase adjustment hole, wherein the fourth pivot hole aligns with the first, second, and third pivot holes and is configured to receive the pivot bolt at a center pivot point, and wherein the at least one phase adjustment hole is configured to receive the adjustment bolt, wherein the locking plate is configured to rotate 360 degrees around the center pivot point such that the at least one phase adjustment hole of the locking plate aligns with one of the second plurality of phase adjustment holes of the adjustable bracket, the arcuate slot of the second mounting bracket, and one of the first plurality of phase adjustment holes of the first mounting bracket such that when the adjustment bolt is received through the aligned phase adjustment holes and the arcuate slot, the antenna is locked at a desired tilt angle.

2. The antenna mount kit of claim 1, wherein the phase adjustment holes of the first plurality of phase adjustment holes of the first mounting bracket and the second plurality of phase adjustment holes of the adjustable bracket are configured such that the desired tilt angle of the antenna is adjustable at 1 degree steps.

3. The antenna mount kit of claim 1, wherein the first mounting bracket, the second mounting bracket, and the at least one locking plate each further comprise a zero degree phase adjustment hole configured to receive the adjustment bolt and, when aligned, lock the antenna at a zero degree tilt angle.

4. The antenna mount kit of claim 1, wherein the second mounting bracket resides between the first mounting bracket and the at least one adjustable bracket when pivotally coupled together.

5. The antenna mount kit of claim 1, wherein the first plurality of phase adjustment holes of the first mounting bracket comprises 12 phase adjustment holes.

6. The antenna mount kit of claim 5, wherein the phase adjustment holes of the first plurality of phase adjustment holes of the first mounting bracket are spaced apart at increments of 30 degrees.

7. The antenna mount kit of claim 1, wherein the second plurality of phase adjustment holes of the adjustable bracket comprises 13 phase adjustment holes.

8. The antenna mount kit of claim 1, wherein the first set of antenna adjustment holes of the second mounting bracket and the second set of antenna adjustment holes of the adjustable bracket each comprise 4 antenna adjustment holes, each antenna adjustment hole corresponding to a different length antenna.

9. The antenna mount kit of claim 8, wherein the antenna adjustment holes of the first set of antenna adjustment holes of the second mounting bracket are located at angles of 80 degrees, 90 degrees, 100 degrees, and 110 degrees relative to an X-axis through the second pivot hole and parallel to a bottom edge of the second mounting bracket when the antenna mount kit is at a zero degree tilt angle.

10. The antenna mount kit of claim 8, wherein the antenna adjustment holes of the second set of antenna adjustment holes of the at least one adjustable bracket are located at angles of 80 degrees, 88.6 degrees, 96.5 degrees, and 105.7 degrees relative to an X-axis through the third pivot hole and parallel to a bottom edge of the adjustable bracket when the antenna mount kit is at a zero degree tilt angle.

11. The antenna mount kit of claim 1, wherein the first mounting bracket is mounted to the pipe clamp and the second mounting bracket is mounted to the antenna, and wherein the pipe clamp is mounted to a mounting structure.

12. The antenna mount kit of claim 1, wherein the second mounting bracket is mounted to the antenna, and wherein the adjustment bolt is inserted through one of the first plurality of phase adjustment holes of the first mounting bracket, the arcuate slot of the second mounting bracket, and one of the second plurality of phase adjustment holes of the adjustment bracket to lock the antenna at the desired tilt angle.

13. The antenna mount kit of claim 1, wherein the second mounting bracket further comprises a reference hole configured to align with one of the second plurality of phase adjustment holes on the adjustable bracket.

14. The antenna mount kit of claim 3, wherein the adjustment bolt is inserted through the zero degree phase adjustment holes of the first mounting bracket, the second mounting bracket, and the at least one locking plate to lock the antenna at the zero degree tilt angle.

15. An antenna mount kit assembly, the antenna mount kit assembly comprising:
   an antenna;
   a mounting structure;
   a pipe clamp configured to be secured to the mounting structure; and
   an antenna mount kit, the antenna mount kit comprising:
      a first mounting bracket mounted to the pipe clamp, the first mounting bracket comprising a first plurality of phase adjustment holes residing circumferentially around a first pivot hole, wherein each of the first plurality of phase adjustment holes is configured to receive an adjustment bolt and the first pivot hole is configured to receive a pivot bolt;
      a second mounting bracket mounted to the antenna and pivotally coupled to the first mounting bracket at the first pivot hole, the second mounting bracket comprising a first set of antenna adjustment holes configured to receive an adjustment pin, an arcuate slot configured to receive the adjustment bolt, and a second pivot hole configured to receive the pivot bolt, wherein the arcuate slot aligns with the one or more of the first plurality of phase adjustment holes of the first mounting bracket and the second pivot hole aligns with the first pivot hole of the first mounting bracket;
      at least one adjustable bracket comprising a second plurality of phase adjustment holes residing circumferentially around a third pivot hole and a second set of antenna adjustment holes that correspond to the first set of antenna adjustment holes of the second mounting bracket, wherein each of the second plurality of phase adjustment holes are configured to receive the adjustment bolt, wherein the third pivot hole aligns with the first and second pivot holes and is configured to receive the pivot bolt, and wherein each of the second set of antenna adjustment holes is configured to receive the adjustment pin and configured to align with a respective antenna adjustment hole of the first set of antenna adjustment holes of the second mounting bracket; and at least one locking plate comprising a fourth pivot hole and at least one phase adjustment hole, wherein the fourth pivot hole aligns with the first, second, and third pivot holes and is configured to receive the pivot bolt at a center pivot point, and wherein the at least one phase adjustment hole is configured to receive the adjustment bolt, wherein the locking plate is configured to rotate 360 degrees around the center pivot point such that the at least one phase adjustment hole of the locking plate aligns with one of the second plurality of phase adjustment holes of the adjustable bracket, the arcuate slot of the second mounting bracket, and one of the first plurality of phase adjustment holes of the first mounting bracket such that when the adjustment bolt is received through the aligned phase adjustment holes and the arcuate slot, the antenna is locked at a desired tilt angle;

wherein the adjustment pin is inserted through the antenna adjustment holes of the first set of antenna adjustment holes of the second mounting bracket and the second set of antenna adjustment holes of the adjustable bracket corresponding to a length of the antenna, and the adjustment bolt is inserted through one of the first plurality of phase adjustment holes of the first mounting bracket, the arcuate slot of the second mounting bracket, one of the second plurality of phase adjustment holes of the adjustable bracket, and the phase adjustment hole of the locking plate to lock the antenna at the corresponding desired tilt angle.

16. The antenna mount kit assembly of claim 15, wherein the pipe clamp is secured to the mounting structure, wherein the second mounting bracket is mounted to the antenna, and wherein the adjustment bolt is inserted through one of the first plurality of phase adjustment holes of the first mounting bracket, the arcuate slot of the second mounting bracket, and one of the second plurality of phase adjustment holes of the adjustment bracket to lock the antenna at the desired tilt angle.

17. The antenna mount kit assembly of claim 15, wherein the phase adjustment holes of the first plurality of phase adjustment holes and the of the second plurality of phase adjustment holes are configured such that the desired tilt angle is adjustable at a 1 degree step.

18. The antenna mount kit assembly of claim 15, wherein the first plurality of phase adjustment holes of the first mounting bracket and the second plurality of phase adjustment holes of the adjustable bracket are configured such that the desired tilt angle of the antenna is adjustable at 1 degree steps.

19. A method of adjusting the downtilt of an antenna, the method comprising:
providing an antenna mount kit comprising a first mounting bracket mounted to a pipe clamp, the first mounting bracket comprising a first plurality of phase adjustment holes residing circumferentially around a first pivot hole, wherein each of the first plurality of phase adjustment holes is configured to receive an adjustment bolt and the first pivot hole is configured to receive a pivot bolt; a second mounting bracket mounted to an antenna and pivotally coupled to the first mounting bracket at the first pivot hole, the second mounting bracket comprising a first set of antenna adjustment holes configured to receive an adjustment pin, an arcuate slot configured to receive the adjustment bolt, and a second pivot hole configured to receive the pivot bolt, wherein the arcuate slot aligns with the one or more of the first plurality of phase adjustment holes of the first mounting bracket and the second pivot hole aligns with the first pivot hole of the first mounting bracket; an adjustable bracket comprising a second plurality of phase adjustment holes residing circumferentially around a third pivot hole and a second set of antenna adjustment holes that correspond to the first set of antenna adjustment holes of the second mounting bracket, wherein each of the second plurality of phase adjustment holes are configured to receive the adjustment bolt, wherein the third pivot hole aligns with the first and second pivot holes and is configured to receive the pivot bolt, and wherein each of the second set of antenna adjustment holes is configured to receive the adjustment pin and configured to align with a respective antenna adjustment hole of the first set of antenna adjustment holes of the second mounting bracket; and a locking plate comprising a fourth pivot hole and at least one phase adjustment hole, wherein the fourth pivot hole aligns with the first, second, and third pivot holes and is configured to receive the pivot bolt at a center pivot point, wherein the at least one phase adjustment hole is configured to receive the adjustment bolt, and wherein the locking plate is configured to rotate 360 degrees around the center pivot point such that the at least one phase adjustment hole of the locking plate aligns with one of the second plurality of phase adjustment holes of the adjustable bracket, the arcuate slot of the second mounting bracket, and one of the first plurality of phase adjustment holes of the first mounting bracket such that when the adjustment bolt is received through the aligned phase adjustment holes and the arcuate slot, the antenna is locked at a desired tilt angle;

rotating the adjustable bracket and the locking plate around the center pivot point such that one of the second plurality of phase adjustment holes of the adjustable bracket and the at least one phase adjustment hole of the locking plate align with the arcuate slot of the second mounting bracket and one of the first plurality of phase adjustment holes of the first mounting bracket for the desired tilt angle; and inserting the adjustment bolt through the aligned phase adjustment holes and arcuate slot, thereby locking the antenna at the desired tilt angle.

20. The method of claim 19, further comprising:
removing the adjustment bolt from the aligned phase adjustment holes and arcuate slot to unlock the antenna from a set tilt angle;
rotating the adjustable bracket and locking plate around the center pivot point such that the same or a different phase adjustment hole of the second plurality of phase adjustment holes of the adjustable bracket and the at least one phase adjustment hole of the locking plate align with the arcuate slot of the second mounting bracket and the same or a different phase adjustment hole of the first plurality of phase adjustment holes of the first mounting bracket for a different desired tilt angle; and reinserting the adjustment bolt through the newly aligned phase adjustment holes and arcuate slot, thereby locking the antenna a new desired tilt angle.

\* \* \* \* \*

UNITED STATES PATENT AND TRADEMARK OFFICE
CERTIFICATE OF CORRECTION

PATENT NO. : 11,682,823 B2  
APPLICATION NO. : 16/996034  
DATED : June 20, 2023  
INVENTOR(S) : Shital Sawanta Udagave It is certified that error appears in the above-identified patent and that said Letters Patent is hereby corrected as shown below:

In the Claims

Column 25, Line 53, Claim 17: Please correct "and the of the" to read --and the phase adjustment holes of the--

Column 27, Line 6, Claim 20: Please correct "antenna a new" to read --antenna at a new--

Signed and Sealed this  
Fifteenth Day of August, 2023

Katherine Kelly Vidal  
*Director of the United States Patent and Trademark Office*